US012609073B2

(12) United States Patent
Han

(10) Patent No.: US 12,609,073 B2
(45) Date of Patent: Apr. 21, 2026

(54) DISPLAY PANEL DRIVING CIRCUIT AND ELECTRONIC DEVICE

(71) Applicant: Honor Device Co., Ltd., Shenzhen (CN)

(72) Inventor: Linhong Han, Shenzhen (CN)

(73) Assignee: HONOR DEVICE CO., LTD., Shenzhen (CN)

(*) Notice: Subject to any disclaimer, the term of this patent is extended or adjusted under 35 U.S.C. 154(b) by 0 days.

(21) Appl. No.: 18/848,850

(22) PCT Filed: Aug. 24, 2023

(86) PCT No.: PCT/CN2023/114668

§ 371 (c)(1),
(2) Date: Sep. 19, 2024

(87) PCT Pub. No.: WO2024/078150

PCT Pub. Date: Apr. 18, 2024

(65) Prior Publication Data

US 2025/0363934 A1 Nov. 27, 2025

(30) Foreign Application Priority Data

Oct. 11, 2022 (CN) ......................... 202211238316.5

(51) Int. Cl.
*G09G 3/32* (2016.01)

(52) U.S. Cl.
CPC ....... *G09G 3/32* (2013.01); *G09G 2310/0267* (2013.01); *G09G 2310/0286* (2013.01); *G09G 2310/08* (2013.01); *G09G 2320/0247* (2013.01); *G09G 2330/021* (2013.01)

(58) Field of Classification Search
CPC ... G09G 2310/0286; G09G 2310/0289; G09G 3/32; G09G 2310/0267; G09G 2310/08; G09G 2320/0247; G09G 2330/021; G11C 27/04
See application file for complete search history.

(56) References Cited

U.S. PATENT DOCUMENTS

| | | | | |
|---|---|---|---|---|
| 11,430,364 | B1 | 8/2022 | Hsieh et al. | |
| 12,112,708 | B2 * | 10/2024 | Lai | G09G 3/3266 |
| 2011/0298771 | A1 | 12/2011 | Yoo et al. | |

(Continued)

FOREIGN PATENT DOCUMENTS

| | | | |
|---|---|---|---|
| CN | 107145192 | A | 9/2017 |
| CN | 107967888 | A | 4/2018 |

(Continued)

*Primary Examiner* — Roberto W Flores
(74) *Attorney, Agent, or Firm* — Conley Rose, P.C.

(57) ABSTRACT

A display panel and an electronic device. The display panel includes cascaded scan driving units. Each scan driving unit includes: a shifting module, configured to control a signal of a first node in response to a first level signal, a first clock signal, and a second clock signal; a gating logic module, configured to receive the first level signal and a second level signal, and control a signal of a second node in response to the signal of the first node and a region gating signal received by a region gating control terminal; and an output module, configured to receive the first level signal or the second level signal, and control a signal outputted by a driving signal output terminal in response to the signal of the second node.

20 Claims, 13 Drawing Sheets

(56) References Cited

U.S. PATENT DOCUMENTS

| | | | |
|---|---|---|---|
| 2016/0314745 | A1 | 10/2016 | Hu et al. |
| 2018/0316784 | A1 | 11/2018 | Bao et al. |
| 2019/0206293 | A1 | 7/2019 | Tian et al. |
| 2021/0090528 | A1 | 3/2021 | Zheng |
| 2022/0076611 | A1* | 3/2022 | Lai ........................ G09G 3/2092 |
| 2022/0189408 | A1 | 6/2022 | Jo et al. |
| 2022/0223083 | A1* | 7/2022 | Lai ............................ G09G 3/20 |
| 2022/0223109 | A1 | 7/2022 | Lai et al. |
| 2023/0059832 | A1 | 2/2023 | Wu et al. |
| 2024/0090264 | A1* | 3/2024 | Kim .................... H10D 30/6723 |

FOREIGN PATENT DOCUMENTS

| | | | |
|---|---|---|---|
| CN | 108806626 | A | 11/2018 |
| CN | 109243359 | A | 1/2019 |
| CN | 109767726 | A | 5/2019 |
| CN | 110517633 | A | 11/2019 |
| CN | 111477185 | A | 7/2020 |
| CN | 111933038 | A | 11/2020 |
| CN | 113362761 | A | 9/2021 |
| CN | 113436584 | A | 9/2021 |
| CN | 115148166 | A | 10/2022 |
| KR | 20220077049 | A | 6/2022 |
| WO | 2021237854 | A1 | 12/2021 |

* cited by examiner

DISPLAY PANEL DRIVING CIRCUIT AND ELECTRONIC DEVICE

CROSS-REFERENCE TO RELATED APPLICATIONS

This is a U.S. National Stage of International Application No. PCT/CN2023/114668, filed on Aug. 24, 2023, which claims priority to Chinese Patent Application No. 202211238316.5, filed on Oct. 11, 2022, both of which are incorporated herein by reference in their entireties.

TECHNICAL FIELD

This application relates to the field of display technologies, and in particular, to a display panel and an electronic device.

BACKGROUND

A display function of an electronic device is mainly achieved by a display panel. The display panel includes a display region and a non-display region. The display region includes a plurality of pixels arranged in an array. Each pixel includes a pixel driving circuit and a light-emitting element. The pixel driving circuit is configured to drive the light-emitting element to emit light, to display an image. A scan driving circuit is arranged in the non-display region. The scan driving circuit is configured to provide a scan signal to the pixel driving circuit, so that the pixel driving circuit drives the light-emitting elements to be turned on row by row.

All regions of an image displayed on a current electronic device generally have the same picture refresh rate. In other words, scan signals of all rows are refreshed at the same rate. In this case, power consumption of the display panel is relatively high, which impedes improvement in an endurance of the electronic device, and degrades user experience.

SUMMARY

To resolve the above technical problem, this application provides a display panel and an electronic device.

According to a first aspect, an embodiment of this application provides a display panel. The display panel includes a scan driving circuit. The scan driving circuit includes N cascaded scan driving units, where N is a positive integer greater than or equal to 2. The scan driving unit of each level includes: a shifting module, electrically connected to a triggering signal input terminal, a first clock signal terminal, a second clock signal terminal, a first level signal receiving terminal, a second level signal receiving terminal, and a first node: a gating logic module, electrically connected to the first node, the first level signal receiving terminal, the second level signal receiving terminal, a region gating control terminal, and a second node: and an output module, electrically connected to the second node, the first level signal receiving terminal, the second level signal receiving terminal, and a driving signal output terminal. The shifting module is configured to: receive a shifting signal of the triggering signal input terminal, a first level signal received by the first level signal receiving terminal, a second level signal received by the second level signal receiving terminal, a first clock signal received by the first clock signal terminal, and a second clock signal received by the second clock signal terminal, and control a signal of the first node in response to the first level signal received by the first level signal receiving terminal, the first clock signal received by the first clock signal terminal, and the second clock signal received by the second clock signal terminal. The triggering signal input terminal is electrically connected to a first node of the scan driving unit of a previous level, the shifting signal is a signal of a first node of the scan driving unit of the previous level, and the signal of the first node is the second level signal or the second clock signal. The gating logic module is configured to: receive the first level signal received by the first level signal receiving terminal and the second level signal received by the second level signal receiving terminal, and control a signal of the second node in response to the signal of the first node and a region gating signal received by the region gating control terminal. The output module is configured to: receive the first level signal received by the first level signal receiving terminal, and control, in response to the signal of the second node, a signal outputted by the driving signal output terminal: or the output module is configured to: receive the second level signal received by the second level signal receiving terminal, and control, in response to the signal of the second node, the signal outputted by the driving signal output terminal. One of the first level signal and the second level signal is a high-level signal, and the other is a low-level signal.

Because the clock signal is a square wave signal, which is periodic, and includes a high-level signal and a low-level signal within one period, when the signal of the first node is the second clock signal and the second clock signal (a high-level signal or a low-level signal) is an effective level signal (which means that the signal can enable some of transistors in a pixel corresponding to the signal to be turned on after passing through the gating logic module and the output module), signals outputted by driving signal output terminals of two adjacent scan driving units may be prevented from overlapping through non-overlapping arrangement of effective signals of two adjacent rows. Further, through arrangement of the gating logic module, the signal of the first node may be selectively processed, so that a signal outputted by the driving signal output terminal may be controlled, to turn on or turn off some of transistors in a pixel corresponding to the signal. When the transistors are turned on, the pixel may be refreshed. When the transistors are turned off, the pixel cannot be refreshed. In this way, control of a refresh rate of the pixel is completed. In summary, through joint action of the shifting module, the gating logic module, and the output module, different refresh rates can be achieved for different regions of the display panel, and a problem of waveform losses between rows can be avoided, thereby ensuring a good display effect at a junction of two regions with different refresh rates.

In addition, compared to a scan driving circuit in the related art, the scan driving circuit provided in embodiments of this application have fewer signal terminals, and correspondingly has fewer signal lines configured to provide signals to the signal terminals, which has a simple structure, occupies fewer non-display regions, facilitates a narrow bezel design of the display panel, and has low costs.

In an example, the scan driving circuit may be a first scan driving circuit configured to drive a reset transistor and a threshold compensation transistor to be turned on or turned off. It may be understood that, the scan driving circuit includes but is not limited to the driving circuit configured to drive the reset transistor and the threshold compensation transistor to be turned on or turned off. A person skilled in the art may select an application scenario of the scan driving circuit based on an actual case.

According to the first aspect, the gating logic module includes: a first inversion unit, electrically connected to the first node, the first level signal receiving terminal, the second level signal receiving terminal, and a third node: a first region gating unit, electrically connected to the third node, the region gating control terminal, the first level signal receiving terminal, and the second node: and a second region gating unit, electrically connected to the third node, the region gating control terminal, the second level signal receiving terminal, and the second node. The first inversion unit is configured to: receive the first level signal received by the first level signal receiving terminal and the second level signal received by the second level signal receiving terminal, and control a signal of the third node in response to the signal of the first node. The first region gating unit is configured to: receive the first level signal received by the first level signal receiving terminal, and control the signal of the second node in response to the signal of the third node and the region gating signal received by the region gating control terminal: or the second region gating unit is configured to: receive the second level signal received by the second level signal receiving terminal, and control the signal of the second node in response to the signal at the third node and the region gating signal received by the region gating control terminal.

The first inversion unit inverts the signal of the first node, so that the signal of the third node is in inverse to the signal of the first node. Through joint action of the first region gating unit and the second region gating unit, the signal of the third node may be selectively processed, to achieve different refresh rates for different regions of the display panel. Certainly; a specific structure of the gating logic module is not limited thereto. A person skilled in the art may arrange the specific structure based on an actual need.

According to the first aspect, the gating logic module includes: a first region gating unit, electrically connected to the first node, the region gating control terminal, the first level signal receiving terminal, and the second node: and a second region gating unit, electrically connected to the first node, the region gating control terminal, the second level signal receiving terminal, and the second node. The first region gating unit is configured to: receive the first level signal received by the first level signal receiving terminal, and control the signal of the second node in response to the signal of the first node and the region gating signal received by the region gating control terminal: or the second region gating unit is configured to: receive the second level signal received by the second level signal receiving terminal, and control the signal of the second node in response to the signal of the first node and the region gating signal received by the region gating control terminal.

Through joint action of the first region gating unit and the second region gating unit, the signal of the first node may be selectively processed, to achieve different refresh rates for different regions of the display panel. Certainly, a specific structure of the gating logic module is not limited thereto. A person skilled in the art may arrange the specific structure based on an actual need.

According to the first aspect or any one of the above implementations in the first aspect, the first region gating unit includes at least two transistors connected in series, the second region gating unit includes at least two transistors connected in parallel, and the transistors of the second region gating unit are connected to the transistors of the first region gating unit in series after being connected in parallel, and are coupled to the second node. When the transistors of the first region gating unit are all turned on, the transistors of the second region gating unit are all turned off, so that the first level signal received by the first level signal receiving terminal electrically connected to the first region gating unit is written into the second node. When at least one transistor of the first region gating unit is turned off, at least one transistor of the second region gating unit is turned on, so that the second level signal received by the second level signal receiving terminal electrically connected to the second region gating unit is written into the second node. The first region gating unit and the second region gating unit have simple logics and are easy to control, which achieve relatively high stability of the circuit.

In an example, the first region gating unit includes two transistors connected in series, three transistors connected in series, or four transistors connected in series. A quantity of transistors in the first region gating unit is not limited in embodiments of this application. The second region gating unit includes two transistors connected in parallel, three transistors connected in parallel, or four transistors connected in parallel. A quantity of transistors in the second region gating unit is not limited in embodiments of this application.

According to the first aspect or any one of the above implementations in the first aspect, the first region gating unit includes a first transistor and a second transistor. The second region gating unit includes a third transistor and a fourth transistor. A first electrode of the first transistor is electrically connected to the first level signal receiving terminal. A second electrode of the first transistor is electrically connected to a first electrode of the second transistor. A second electrode of the second transistor, a first electrode of the third transistor, and a first electrode of the fourth transistor are all coupled to the second node. A second electrode of the third transistor and a second electrode of the fourth transistor are both electrically connected to the second level signal receiving terminal. A gate of the first transistor is coupled to a gate of the third transistor, a gate of the second transistor is coupled to a gate of the fourth transistor, when the gating logic module includes the first inversion unit, the first region gating unit, and the second region gating unit, ones of the gates of the first transistor and the third transistor and the gates of the second transistor and the fourth transistor are coupled to the third node, and the others thereof are coupled to the region gating control terminal, and when the gating logic module includes the first region gating unit and the second region gating unit, ones of the gates of the first transistor and the third transistor and the gates of the second transistor and the fourth transistor are coupled to the first node, and the others thereof are coupled to the region gating control terminal. In other words, the first region gating unit includes two transistors connected in series, and the second region gating unit includes two transistors connected in parallel. In this way; the first region gating unit and the second region gating unit have simple structures, so that the scan driving unit has a simple structure, thereby facilitating a narrow bezel design of the display panel.

In an example, when the gating logic module includes the first inversion unit, the first region gating unit, and the second region gating unit, the gate of the first transistor is coupled to the gate of the third transistor, and the gates are coupled to the third node, and the gate of the second transistor is coupled to the gate of the fourth transistor, and the gates are coupled to the region gating control terminal: or the gate of the first transistor is coupled to the gate of the third transistor, and the gates are coupled to the region gating control terminal, and the gate of the second transistor is coupled to the gate of the fourth transistor, and the gates are coupled to the third node.

In an example, when the gating logic module includes the first region gating unit and the second region gating unit, the gate of the first transistor is coupled to the gate of the third transistor, and the gates are coupled to the first node, and the gate of the second transistor is coupled to the gate of the fourth transistor, and the gates are coupled to the region gating control terminal: or the gate of the first transistor is coupled to the gate of the third transistor, and the gates are coupled to the region gating control terminal, and the gate of the second transistor is coupled to the gate of the fourth transistor, and the gates are coupled to the first node.

According to the first aspect or any one of the above implementations in the first aspect, the first transistor and the second transistor are both P-type transistors, and the third transistor and the fourth transistor are both N-type transistors: or the first transistor and the second transistor are both N-type transistors, and the third transistor and the fourth transistor are both P-type transistors. A combination of the N-type transistor and the P-type transistor effectively reduces a quantity of thin film transistors required for the scan driving unit, so that the scan driving unit has a simpler structure, thereby facilitating a narrower bezel design of the display panel.

According to the first aspect or any one of the above implementations in the first aspect, the first inversion unit includes a fifth transistor and a sixth transistor. A gate of the fifth transistor and a gate of the sixth transistor are both electrically connected to the first node, a first electrode of the fifth transistor is electrically connected to the first level signal receiving terminal, and a second electrode of the fifth transistor and a first electrode of the sixth transistor are both electrically connected to the third node. A second electrode of the sixth transistor is electrically connected to the second level signal receiving terminal. In other words, the first inversion unit has a simple structure, so that the scan driving unit has a simple structure, thereby facilitating the narrow bezel design of the display panel.

According to the first aspect or any one of the above implementations in the first aspect, the display panel includes a first display region and a second display region, and the region gating signal includes a first region gating signal and a second region gating signal. The scan driving unit connected to a pixel in the first display region is configured to receive the first region gating signal, and the scan driving unit connected to a pixel in the second display region is configured to receive the second region gating signal. One of the first region gating signal and the second region gating signal is a high-level signal, and the other is a low-level signal, so that a signal of the second node of the scan driving unit connected to the pixel in the first display region is one of the first level signal and the second level signal, and a signal of the second node of the scan driving unit connected to the pixel in the second display region is the other of the first level signal and the second level signal. In this way, different pixel refresh rates are achieved for the first display region and the second display region, thereby satisfying different picture refresh rate needs of different display regions.

In an example, the first region gating signal is a high-level signal, and the second region gating signal is a low-level signal: or the second region gating signal is a high-level signal, and the first region gating signal is a low-level signal.

In an example, the pixel refresh rate of the first display region is 1 Hz or 10 Hz, and the pixel refresh rate of the second display region is 60 Hz: or the pixel refresh rate of the second display region is 1 Hz or 10 Hz, and the pixel refresh rate of the first display region is 60 Hz.

According to the first aspect or any one of the above implementations in the first aspect, the display panel includes a region gating signal line, and the region gating signal line is configured to transmit the region gating signal. The region gating control terminals of the scan driving units are connected to a same region gating signal line. It is unnecessary to arrange an independent region gating signal line for each scan driving unit, thereby reducing a quantity of region gating signal lines, and simplifying the structure.

According to the first aspect or any one of the above implementations in the first aspect, when the signal of the first node is the second clock signal, signals of first nodes of two adjacent scan driving units do not overlap. When the scan driving circuit is applied to a partial refreshing technology; a good display effect at a junction of two regions with different refresh rates can be ensured.

According to the first aspect or any one of the above implementations in the first aspect, the output module includes a second inversion unit, and the second inversion unit includes a seventh transistor and an eighth transistor. A gate of the seventh transistor and a gate of the eighth transistor are both electrically connected to the second node, a first electrode of the seventh transistor is electrically connected to the first level signal receiving terminal, and a second electrode of the seventh transistor and a first electrode of the eighth transistor are both electrically connected to the driving signal output terminal. A second electrode of the eighth transistor is electrically connected to the second level signal receiving terminal. Control of the signal of the first node can be achieved through only two transistors, so that the output module has a simple structure, and therefore the scan driving unit has a simple structure.

According to the first aspect or any one of the above implementations in the first aspect, the shifting module includes: an input unit, electrically connected to the triggering signal input terminal, the first clock signal terminal, and a fourth node: a first control unit, electrically connected to the first clock signal terminal, the first level signal receiving terminal, the fourth node, and a fifth node: a second control unit, electrically connected to the second level signal receiving terminal, the second clock signal terminal, the fourth node, and the fifth node: and an output unit, electrically connected to the first level signal receiving terminal, the second level signal receiving terminal, the second clock signal terminal, the fourth node, the fifth node, and the first node. The input unit is configured to: receive the shifting signal of the triggering signal input terminal, and control a signal of the fourth node in response to the first clock signal received by the first clock signal terminal. The first control unit is configured to: receive the first clock signal received by the first clock signal terminal and the first level signal received by the first level signal receiving terminal, and control a signal of the fifth node in response to the signal of the fourth node and the first clock signal received by the first clock signal terminal. The second control unit is configured to: receive the second level signal received by the second level signal receiving terminal, and change the signal of the fourth node in response to the signal of the fifth node and the second clock signal received by the second clock signal terminal. The output unit is configured to: receive the second level signal received by the second level signal receiving terminal, and control the signal of the first node in response to the signal of the fifth node: or the output module is configured to: receive the second clock signal received by the second clock signal terminal, and control the signal of the first node in response to the signal of the fourth node.

The shifting module provided in embodiments of this application has fewer signal terminals, and correspondingly, has fewer signal lines configured to provide signals to the signal terminals, which has a simple structure, so that the scan driving unit has a simple structure, facilitates the narrow bezel design of the display panel, and has low costs.

According to the first aspect or any one of the above implementations in the first aspect, the input unit includes a ninth transistor. A gate of the ninth transistor is electrically connected to the first clock signal terminal, a first electrode of the ninth transistor is electrically connected to the triggering signal input terminal, and a second electrode of the ninth transistor is electrically connected to the fourth node. Control of the signal of the fourth node can be achieved through only one transistor, so that the input unit has a simple structure, and therefore the scan driving unit has a simple structure.

According to the first aspect or any one of the implementations of the first aspect, the first control unit includes a tenth transistor and an eleventh transistor. A gate of the tenth transistor is electrically connected to the first clock signal terminal, a first electrode of the tenth transistor is electrically connected to the first level signal receiving terminal, and a second electrode of the tenth transistor and a second electrode of the eleventh transistor are both electrically connected to the fifth node. A gate of the eleventh transistor is electrically connected to the fourth node, and a first electrode of the eleventh transistor is electrically connected to the first clock signal terminal. Control of the signal of the fifth node can be achieved through only two transistors, so that the first control unit has a simple structure, and therefore the scan driving unit has a simple structure.

According to the first aspect or any one of the implementations of the first aspect, the second control unit includes a twelfth transistor and a thirteenth transistor. A gate of the twelfth transistor is electrically connected to the second clock signal terminal, a first electrode of the twelfth transistor is electrically connected to the fourth node, and a second electrode of the twelfth transistor is electrically connected to a first electrode of the thirteenth transistor. A gate of the thirteenth transistor is electrically connected to the fifth node, and a second electrode of the thirteenth transistor is electrically connected to the second level signal receiving terminal. The second control unit has a simple structure, so that the scan driving unit has a simple structure.

According to the first aspect or any one of the implementations of the first aspect, the output unit includes a fourteenth transistor, a fifteenth transistor, a sixteenth transistor, a first capacitor, and a second capacitor. A gate of the fourteenth transistor is electrically connected to the first level signal receiving terminal, a first electrode of the fourteenth transistor is electrically connected to the fourth node, and a second electrode of the fourteenth transistor is electrically connected to a first electrode of the first capacitor and a gate of the fifteenth transistor. A second electrode of the first capacitor, a second electrode of the fifteenth transistor, and a first electrode of the sixteenth transistor are all electrically connected to the first node. A first electrode of the fifteenth transistor is electrically connected to the second clock signal terminal. A gate of the sixteenth transistor and a first electrode of the second capacitor are both electrically connected to the fifth node, and a second electrode of the sixteenth transistor and a second electrode of the second capacitor are both electrically connected to the second level signal receiving terminal. The output unit has a simple structure, so that the scan driving unit has a simple structure. In addition, through arrangement of the capacitors, signals of the gates of the fifteenth transistor and the sixteenth transistor are more stable.

According to the first aspect or any one of the above implementations in the first aspect, the display panel further includes a first clock signal line and a second clock signal line. A first clock signal terminal of a scan driving unit of an odd level is electrically connected to the first clock signal line, and a second clock signal terminal of the scan driving unit of the odd level is electrically connected to the second clock signal line. A first clock signal terminal of a scan driving unit of an even level is electrically connected to the second clock signal line, and a second clock signal terminal of the scan driving unit of the even level is electrically connected to the first clock signal line. It is unnecessary to arrange an independent first clock signal line and an independent second clock signal line for each scan driving unit, thereby reducing a quantity of clock signal lines, and simplifying the structure.

According to a second aspect, an embodiment of this application further provides an electronic device. The electronic device includes the display panel in the first aspect and any implementation of the first aspect. The second aspect corresponds to the first aspect and any implementation of the first aspect. For technical effects corresponding to the second aspect, refer to the technical effects corresponding to the first aspect and any implementation of the first aspect. Details are not described herein.

DESCRIPTION OF EMBODIMENTS

The technical solutions in embodiments of this application are clearly and described below with reference to drawings in embodiments of this application. Apparently, the described embodiments are merely some rather than all embodiments of this application. All other embodiments obtained by a person of ordinary skill in the art based on embodiments of this application without creative efforts fall within the protection scope of this application.

A term "and/or" herein describes only an association relationship for describing associated objects and represents that three relationships may exist. For example, A and/or B may represent the following three cases: only A exists, both A and B exist, and only B exists.

Terms "first", "second", and the like in the specification of embodiments of this application and the claims are used to distinguish between different objects, but are not used to indicate a specific sequence of objects. For example, a first target object and a second target object are used to distinguish between different target objects, but are not used to describe a specific sequence of the target objects.

In embodiments of this application, a word such as "in an example" or "for example" is used to represent giving an example, an illustration, or a description. Any embodiment or design solution described as "in an example" or "for example" in embodiments of this application should be not explained as being more preferential or having more advantages than other embodiments or design solutions. Exactly, use of the word such as "in an example" or "for example" is intended to present a concept in a specific manner.

In the description of embodiments of this application, unless otherwise specified, "a plurality of" means two or more. For example, a plurality of processing units mean two or more processing units. A plurality of systems mean two or more systems.

Figure 1:
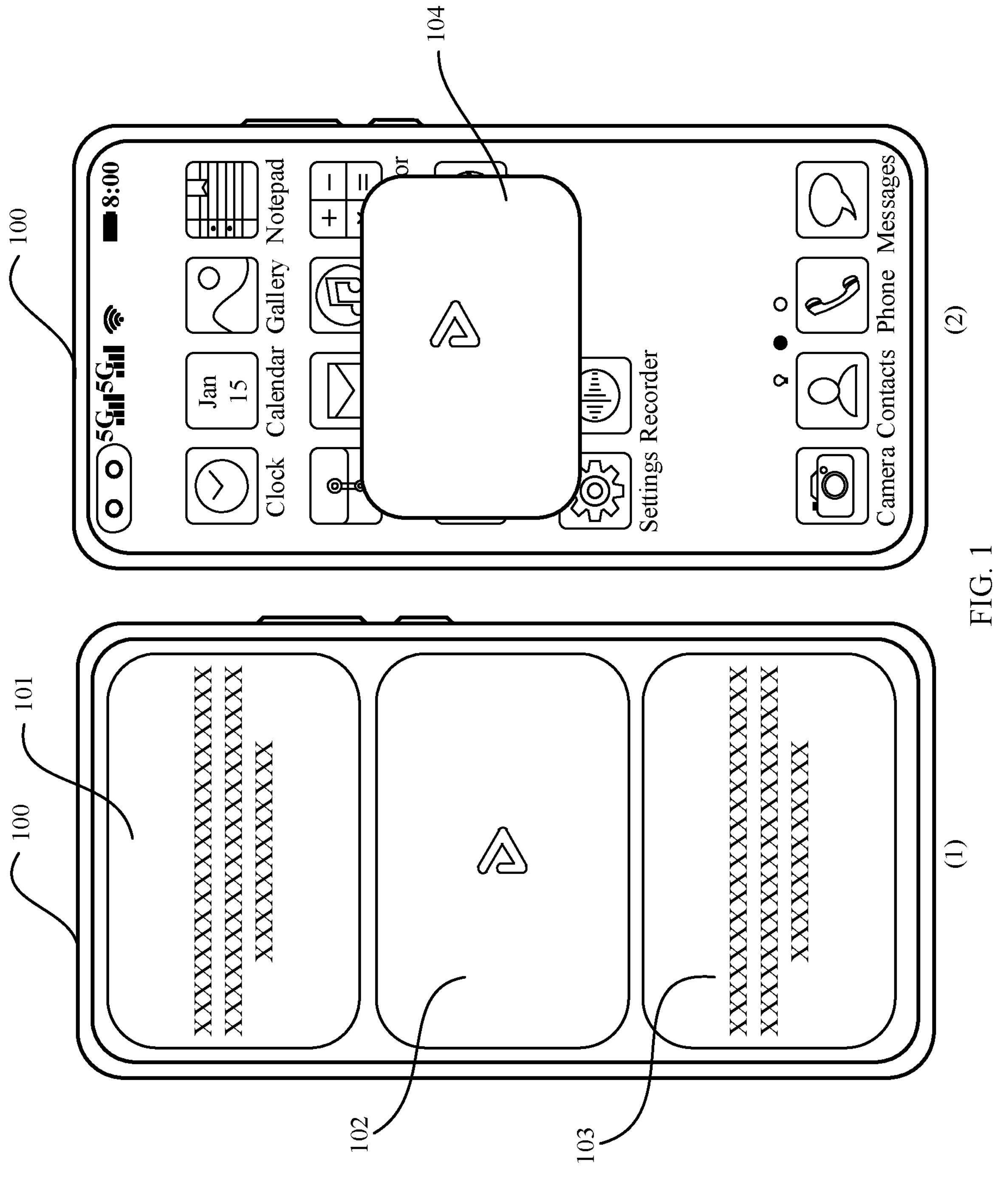
FIG. 1 is an application scenario of an electronic device according to an embodiment of this application.

FIG. 1 is a schematic diagram of an example application scenario. As shown in FIG. 1, an electronic device 100 displays various contents through a display panel. In (1) in FIG. 1, text contents or pictures are displayed in a region 101 and a region 103, and a dynamic content is displayed in a region 102. Alternatively, static contents are displayed in the region 101 and the region 103, and a dynamic content is displayed in the region 102. In (2) in FIG. 1, a main interface of the electronic device is displayed in a main region, and video playback is performed in a region of a small window 104.

In a case similar to FIG. 1, if displayed contents of all regions are refreshed at a same refresh rate, power consumption of the display panel is relatively high while display quality is not significantly improved.

Based on the above, embodiments of this application provide a display panel and an electronic device to which the display panel is applicable. The electronic device may be a smart terminal including a display panel, such as a mobile phone, a table computer, a notebook computer, a personal digital assistant (personal digital assistant, PDA for short), an on-board computer, a smart wearable device, or a smart home device. A specific form of the electronic device is not limited in embodiments of this application.

For a region in which a displayed content remains unchanged or a region in which a static content such as a text and a picture is displayed, the displayed content is refreshed at a relatively low refresh rate. For a region in which a displayed content changes in real time or a region in which a dynamic content such as a video is displayed, the displayed content is refreshed at a relatively high refresh rate. In other words, different refresh rates are selected for different displayed contents in different regions, to refresh the displayed contents. In this way, the refresh rate for a region such as the region in which the displayed content remains unchanged or the region in which the static content such as a text and a picture is relatively low. Because in the region, the displayed content remains unchanged, or the static content such as a text and a picture is displayed, the reduction in the refresh rate causes no significant impact to display quality: In this way, not only the display quality is maintained, but also the power consumption of the display panel is reduced, thereby improving an endurance of the electronic device.

Figure 2:
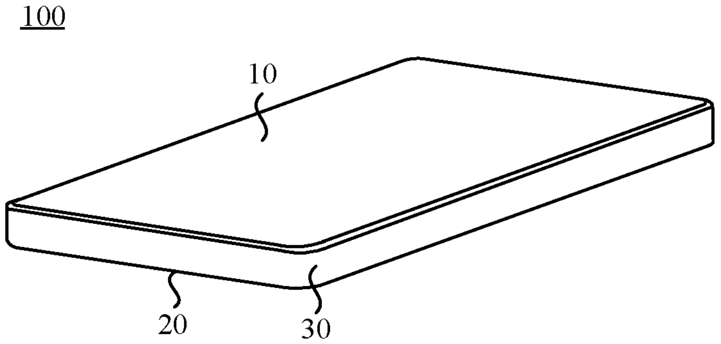
FIG. 2 is a schematic structural diagram of an electronic device according to an embodiment of this application.

Structures in the display panel provided in embodiments of this application and a principle for achieving different refresh rates for different regions are described below in combination with an electronic device. Referring to FIG. 2, a description is provided by using an example in which the electronic device is a mobile phone.

As shown in FIG. 2, a mobile phone 100 includes a display panel 10, a rear housing 20, and a middle frame 30. An accommodation cavity may be defined by the display panel 10, the rear housing 20, and the middle frame 30. Structures such as a printed circuit board, a battery, and a functional device (not shown in the figure) are arranged in the accommodation cavity. The functional device includes, for example, a display driving chip and a processor. The processor sends a corresponding signal to the display driving chip, so that the display driving chip drives the display panel 10 to perform display:

A material of the rear housing 20 may include, for example, a non-transparent material such as plastic, vegan leather, or glass fiber, or may include a non-transparent material such as glass. The material of the rear housing 20 is not limited in this embodiment of this application.

The display panel 10 includes, for example, a liquid crystal display (Liquid Crystal Display; LCD) panel, an organic light emitting diode (Organic Light Emitting Diode, OLED) display panel, and an LED display panel. The LED display panel includes, for example, a micro-LED display panel, and a mini-LED display panel. A type of the display panel 10 is not limited in this embodiment of this application. A description is provided below by using an example in which the display panel 10 is the OLED display panel.

Figure 3:
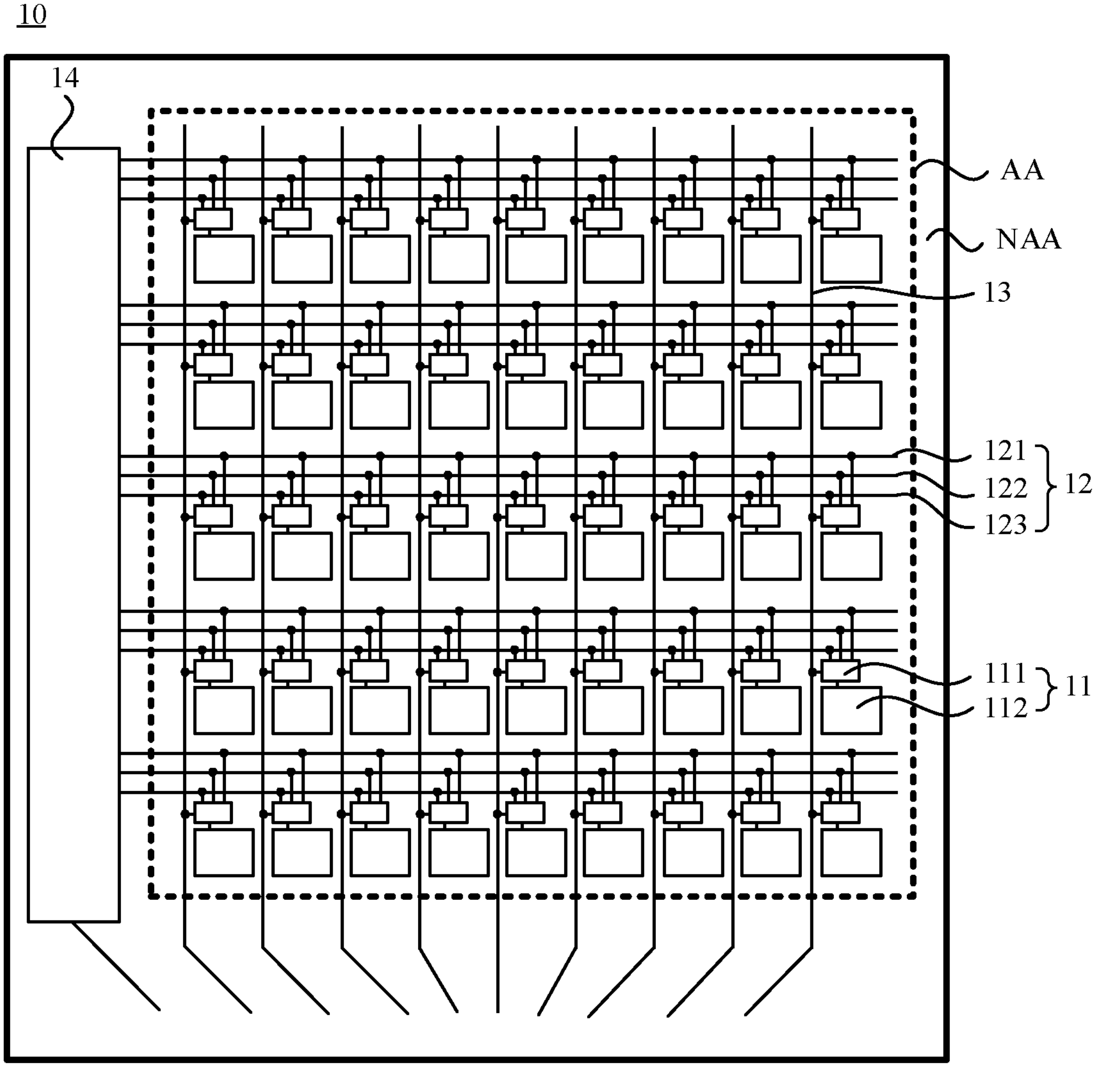
FIG. 3 is a schematic structural diagram of a display panel according to an embodiment of this application.

As shown in FIG. 3, the display panel 10 includes a display region AA and a non-display region NAA. The non-display region NAA is located on at least one side of the display region AA. FIG. 3 is described by using an example in which the non-display region NAA is arranged around the display region AA. A plurality of pixels 11 arranged in an array; a plurality of scan line groups 12, and a plurality of data lines 13 are arranged in the display region AA of the display panel 10. Each pixel 11 includes a pixel driving circuit 111 and a display unit (which is also referred to as a light-emitting element) 112. The plurality of data lines 13 are in one-to-one correspondence with pixel driving circuits 111 of a plurality of columns of pixels 11. In other words, pixel driving circuits 111 of one column of pixels 11 correspond to one data line 13. The plurality of scan line groups 12 are in one-to-one correspondence with pixel driving circuits 111 of a plurality of rows of pixels 11. In other words, pixel driving circuits 111 of one row of pixels 11 correspond to one scan line group 12.

Figure 4:
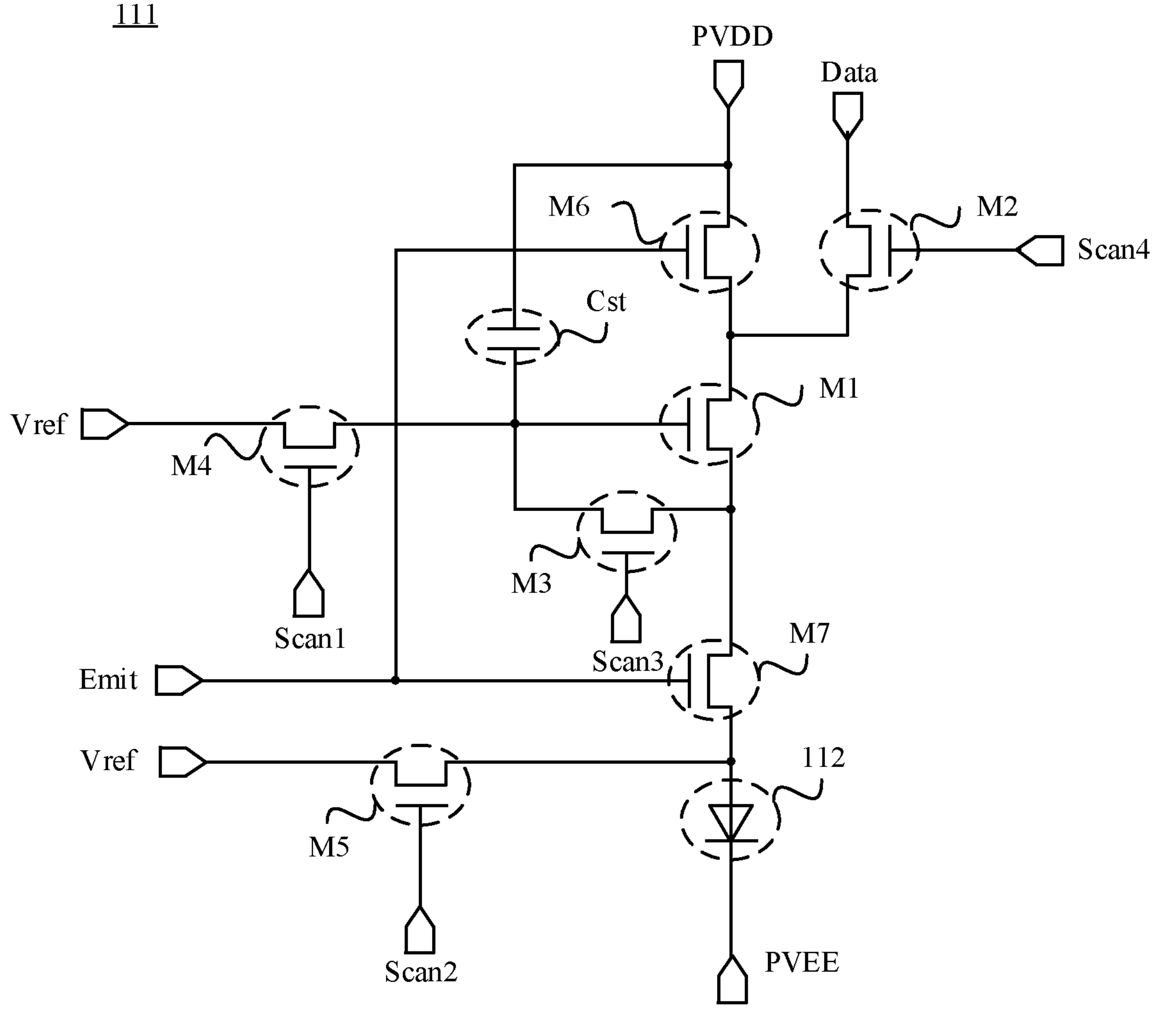
FIG. 4 is a schematic structural diagram of a pixel driving circuit according to an embodiment of this application.

With reference to FIG. 4, the pixel driving circuit 111 includes, for example, 7T1C (7 transistors and 1 storage capacitor). To be specific, the pixel driving circuit 111 may include a driving transistor Ml, a data writing transistor M2, a threshold compensation transistor M3, reset transistors M4 and M5, light emission control transistors M6 and M7, and a storage capacitor Cst.

It may be understood that, a specific structure of the pixel driving circuit 111 includes but is not limited to the above examples. In other optional embodiments, the pixel driving circuit 111 may have another arrangement, as long as the pixel driving circuit can drive the display unit 112 to emit light.

In some embodiments, the reset transistor M4 and the threshold compensation transistor M3 are transistors using oxide semiconductor materials such as indium gallium zinc oxide (indium gallium zinc oxide, IGZO) as an active layer, and the transistors are, for example, N-type transistors. The driving transistor M1, the data writing transistor M2, the reset transistor M5, and the light emission control transistors M6 and M7 are transistors using silicon, optionally, polycrystalline silicon such as a low temperature polysilicon (Low Temperature Poly-Silicon, LTPS) material as an active layer, and the transistors are, for example, P-type transistors. The LTPS transistor and the IGZO transistor are integrated onto a substrate to form a low temperature polycrystalline oxide (LTPO, Low Temperature Polycrystalline Oxide) display panel 10.

The low temperature poly-silicon transistor has advantages such as high carrier mobility; fast response, and low power consumption, and the oxide semiconductor transistor has an advantage of a small current leakage. Therefore, when the pixel driving circuit 111 includes both the transistor using the LTPS material as the active layer and the transistor using the IGZO material as the active layer, desirable performance of the pixel driving circuit 111 can be ensured. For example, because the oxide semiconductor transistor has the advantage of a small current leakage, during low-rate refreshing, a gate potential of the driving transistor MI can be maintained to be stable and be prevented from leaking, thereby preventing a picture from flickering at a low rate.

In addition, a combination of the N-type transistor and the P-type transistor effectively reduces a quantity of thin film transistors required for the pixel driving circuit 111, so that the pixel driving circuit 111 has a simpler structure.

Still referring to FIG. 4, the pixel driving circuit 111 further includes an initialization signal terminal Vref, a first power terminal PVDD, a second power terminal PVEE, a data signal terminal Data, a first scan signal terminal Scan1, a second scan signal terminal Scan2, a third scan signal terminal Scan3, a fourth scan signal terminal Scan4, and a light emission control signal terminal Emit. A first electrode of the light emission control transistor M6 is electrically connected to the first power terminal PVDD. A first electrode of the data writing transistor M2 is electrically connected to the data signal terminal Data. A gate of the data writing transistor M2 is electrically connected to the fourth scan signal terminal Scan4. A gate of the threshold compensation transistor M3 is electrically connected to the third scan signal terminal Scan3. First electrodes of the reset transistors M4 and M5 are electrically connected to the initialization signal terminal Vref (initialization signal terminals respectively corresponding to the two may be the same or different). A gate of the reset transistor M4 may be electrically connected to the first scan signal terminal Scan1. A gate of the reset transistor M5 may be electrically connected to the second scan signal terminal Scan2. Gates of the light emission control transistors M6 and M7 may be electrically connected to the light emission control signal terminal Emit. The light emission control transistor M7 is electrically connected to an anode of the first light-emitting element 112, and a cathode of the first light-emitting element 112 is electrically connected to the second power terminal PVEE.

Correspondingly, still referring to FIG. 3, each scan line group 12 includes a first scan signal line 121, a second scan signal line 122, and a light emission control signal line 123.

Correspondingly, that the pixel driving circuits 111 of one column of pixels 11 correspond to one data line 13 means that data signal terminals Data of pixel driving circuits 111 of pixels 11 in the same column are electrically connected to the same data line 13. That the pixel driving circuits 111 of one row of pixels 11 correspond to one scan line group 12 means that first scan signal terminals Scan1 of pixel driving circuits 111 of pixels 11 in the same row are electrically connected to a first scan signal line 121 corresponding to the row, second scan signal terminals Scan2 of the pixel driving circuits 111 of the pixels 11 in the same row are electrically connected to a second scan signal line 122 corresponding to the row; third scan signal terminals Scan3 of the pixel driving circuits 111 of the pixels 11 in the same row are electrically connected to a first scan signal line 121 corresponding to another row (a specific row may be set by a person skilled in the art based on an actual case), fourth scan signal terminals Scan4 of the pixel driving circuits 111 of the pixels 11 in the same row are electrically connected to a second scan signal line 122 corresponding to another row (a specific row may be set by a person skilled in the art based on an actual case), and light emission control signal terminals Emit of the pixel driving circuits 111 of the pixels 11 in the same row are electrically connected to the same light emission control signal line 123.

It should be noted that, to ensure simplicity and clarity of the circuit, FIG. 3 does not show that the third scan signal terminals Scan3 of the pixel driving circuits 111 of the pixels 11 in the same row are electrically connected to the first scan signal line 121 corresponding to the another row and the fourth scan signal terminals Scan4 of the pixel driving circuits 111 of the pixels 11 in the same row are electrically connected to the second scan signal line 122 corresponding to the another row.

To be specific, a pixel driving circuit 111 using the LTPO process usually requires three types of gate control signals: a light emission control signal transmitted by the light emission control signal line 123, a first scan signal transmitted by the first scan signal line 121, and a second scan signal transmitted by the second scan signal line 122. On or off of light emission control transistors M6 and M7 on a light-emitting branch may be controlled through the light emission control signal transmitted by the light emission control signal line 123. On or off of the reset transistors M4 and the threshold compensation transistor M3 each using the IGZO as the active layer may be controlled through the first scan signal transmitted by the first scan signal line 121. To be specific, the on or off of the reset transistor M4 may be controlled through a first scan signal transmitted by a first scan signal line 121 corresponding to a row at which the reset transistor M4 is located, and the on or off of the threshold compensation transistor M3 may be controlled through a first scan signal transmitted by a first scan signal line 121 corresponding to another row. On or off of the reset transistors M5 and the data writing transistor M2 each using the LTPS as the active layer may be controlled through the second scan signal transmitted by the second scan signal line 122. To be specific, the on or off of the reset transistor M5 may be controlled through a second scan signal transmitted by a second scan signal line 122 corresponding to a row at which the reset transistor M5 is located, and the on or off of the data writing transistor M2 may be controlled through a second scan signal transmitted by the second scan signal line 122 corresponding to another row.

When the first scan signal line 121 and the second scan signal line 122 provide the first scan signal and the second scan signal to pixels 11 in a row corresponding to the first scan signal line and the second scan signal line, a pixel 11 that needs to be refreshed may be selected. The data line 13 provides a data signal to a pixel driving circuit 111 in a corresponding column, to refresh a data signal of the pixel 11 selected through the first scan signal and the second scan signal. The light emission control signal line provides a light emission control signal to the pixel 11 in the corresponding row, to control light-emitting time of the pixel 11. The pixel driving circuit 111 generates a driving current under the action of the first scan signal, the second scan signal, the light emission control signal, the data signal, and the like, to drive the display unit 112 to emit light. A specific principle based on which the pixel driving circuit 111 generates the driving current based on the first scan signal, the second scan signal, the light emission control signal, the data signal, and the like to drive the display unit 112 to emit light is similar to a principle based on which a pixel driving circuit of 7T1C in the related art generates a driving current to drive a display unit to emit light. Details are not described herein.

Refreshing different regions of the display panel means refreshing pixels 11 in the different regions of the display panel. To be specific, a new data signal is provided to pixel driving circuits 111 of the pixels 11 in the regions, to update the data signals of the pixel driving circuits 111 (that is, refreshing gate potentials of the driving transistors M1), thereby refreshing driving currents of the driving transistors M1. When the pixel 11 is not refreshed, the data signal of the pixel driving circuit 111 of the pixel 11 remains at a data signal of a previous frame, and the driving current remains at a driving current of the previous frame during light emission. When the pixel 11 is not refreshed, the corresponding transistor remains off, and no current flows through the transistor, so that power consumption is reduced.

Still referring to FIG. 3, a driving circuit 14 is arranged in the non-display region NAA of the display panel 10. The driving circuit 14 may include, for example, a first scan driving circuit, a second scan driving circuit, and a light emission control driving circuit. The first scan driving circuit includes a plurality of first scan signal output terminals, the second scan driving circuit includes a plurality of second scan signal output terminals, and the light emission control driving circuit includes a plurality of light emission control signal output terminals. The plurality of first scan signal output terminals of the first scan driving circuit are electrically connected to a plurality of first scan signal lines 121 in the display region AA in one-to-one correspondence, the plurality of second scan signal output terminals of the second scan driving circuit are electrically connected to a plurality of second scan signal lines 122 in the display region AA in one-to-one correspondence, and the plurality of light emission control signal output terminals of the light emission control driving circuit are electrically connected to a plurality of light emission control signal lines 123 in the display region AA in one-to-one correspondence. The first scan driving circuit transmits the first scan signal to the first scan signal lines 121 through the first scan signal output terminals, the second scan driving circuit transmits the second scan signal to the second scan signal line 122 through the second scan signal output terminals, and the light emission control driving circuit transmits the light emission control signal to the light emission control signal lines 123 through the light emission control signal output terminals.

It should be noted that, the driving circuit 14 (the first scan driving circuit, the second scan driving circuit, and/or the light emission control driving circuit) may be arranged on one side of the display region AA, or may be arranged on two opposite sides of the display region AA (that is, the two opposite sides of the display region AA each are provided with the driving circuit 14). In an example, when the first scan driving circuit of the driving circuit 14 is arranged on the two opposite sides of the display region AA (that is, the two opposite sides of the display region AA each are provided with the first scan driving circuit), first scan signal output terminals of the two first scan driving circuits are electrically connected to one first scan signal line 121, to provide the first scan signal to the first scan signal line 121. In this way, voltage drop can be reduced. All embodiments of this application are described by using an example in which the driving circuit 14 is arranged on one side of the display region AA.

Figure 5:
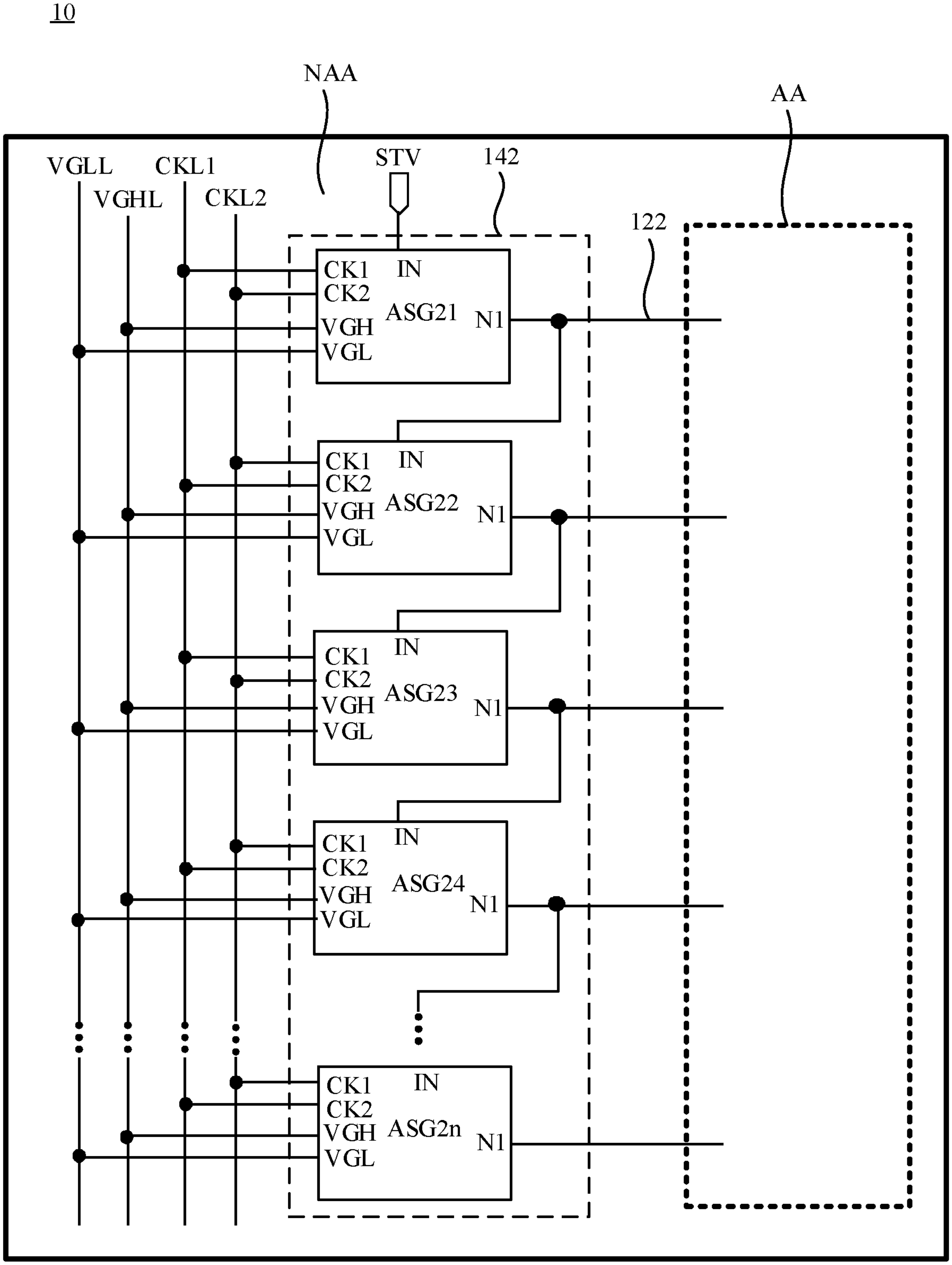
FIG. 5 is a schematic structural diagram of another display panel according to an embodiment of this application.

Referring to FIG. 5, a second scan driving circuit 142 (which is a driving circuit configured to provide a second scan signal to the pixel 11) includes N cascaded scan driving units ASG2, for example, may include N scan driving units ASG21 to ASG2*n*, where N≥2. A person skilled in the art may set a specific value of N based on an actual case. This is not limited herein.

The scan driving unit ASG2 of each level includes a first clock signal terminal CK1, a second clock signal terminal CK2, a triggering signal input terminal IN, a first level signal receiving terminal VGL, a second level signal receiving terminal VGH, and a first node N1. The first node N1 serves as an output terminal, and is configured to provide a second scan signal to the second scan signal line 122, to provide the second scan signal to the pixel 11 through the second scan signal line 122. A first node N1 of the scan driving unit ASG2 of each level other than a scan driving unit ASG2*n* of a last level is electrically connected to a triggering signal input terminal IN of a scan driving unit ASG2 of an adjacent next level. A triggering signal input terminal IN of a scan driving unit ASG21 of a first level is electrically connected to a triggering signal line STV, to receive a triggering signal sent by the triggering signal line STV.

The scan driving unit ASG2 sends the second scan signal to the second scan signal line 122 through the first node N1 based on a first clock signal inputted by the first clock signal terminal CK1, a second clock signal inputted by the second clock signal terminal CK2, a triggering signal inputted by the triggering signal input terminal IN, a first level signal inputted by the first level signal receiving terminal VGL, and a second level signal inputted by the second level signal receiving terminal VGH.

The second scan driving circuit 142 further includes a first clock signal line CKL1, a second clock signal line CKL2, a first level signal line VGLL, and a second level signal line VGHL located in the non-display region NAA, and a clock signal outputted by the first clock signal line CKL1 and a clock signal outputted by the second clock signal line CKL2 are two clock signals inverse to each other. The first level signal receiving terminals VGL of the scan driving units ASG2 of the second scan driving circuit 142 are electrically connected to a same first level signal line VGLL, and the second level signal receiving terminals VGH of the scan driving units ASG2 of the second scan driving circuit 142 are electrically connected to a same second level signal line VGHL. A first clock signal terminal CK1 of a scan driving unit ASG2 of an odd level is electrically connected to the first clock signal line CKL1, and a second clock signal terminal CK2 of the scan driving unit ASG2 of the odd level is electrically connected to the second clock signal line CKL2. A first clock signal terminal CK1 of a scan driving unit ASG2 of an even level is electrically connected to the second clock signal line CKL2, and a second clock signal terminal CK2 of the scan driving unit ASG2 of the even level is electrically connected to the first clock signal line CKL1. As shown in FIG. 5, first clock signal terminals CK1 of the scan driving unit ASG21 of the first level and a scan driving unit ASG23 of a third level are electrically connected to the first clock signal line CKL1, and second clock signal terminals CK2 of the scan driving unit ASG21 of the first level and the scan driving unit ASG23 of the third level are electrically connected to the second clock signal line CKL2. First clock signal terminals CK1 of a scan driving unit ASG22 of a second level and a scan driving unit ASG24 of a fourth level are electrically connected to the second clock signal line CKL2, and second clock signal terminals CK2 of the scan driving unit ASG22 of the second level and the scan driving unit ASG24 of the fourth level are electrically connected to the first clock signal line CKL1.

Figure 6:
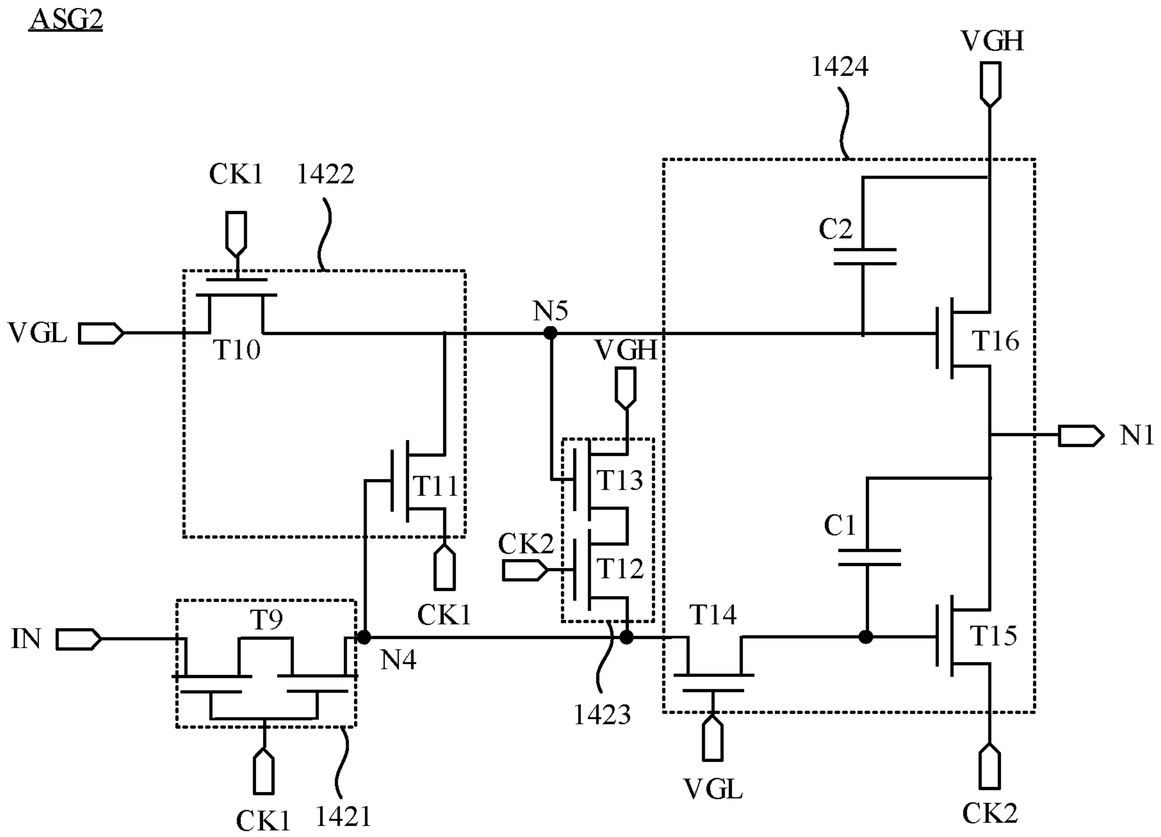
FIG. 6 is a schematic structural diagram of a second scan driving unit according to an embodiment of this application.

With reference to FIG. 6, the scan driving unit ASG2 of the second scan driving circuit 142 further includes an input unit 1421, a first control unit 1422, a second control unit 1423, and an output unit 1424. The input unit 1421 includes a ninth transistor T9. A gate of the ninth transistor T9 is electrically connected to the first clock signal terminal CK1, a first electrode of the ninth transistor T9 is electrically connected to the triggering signal input terminal IN, and a second electrode of the ninth transistor T9 is electrically connected to a fourth node N4. The first control unit 1422 includes a tenth transistor T10 and an eleventh transistor T11. A gate of the tenth transistor T10 is electrically connected to the first clock signal terminal CK1, a first electrode of the tenth transistor T10 is electrically connected to the first level signal receiving terminal VGL, a second electrode of the tenth transistor T10 and a second electrode of the eleventh transistor T11 are both electrically connected to a fifth node N5, a gate of the eleventh transistor T11 is electrically connected to the fourth node N4, and a first electrode of the eleventh transistor T11 is electrically connected to the first clock signal terminal CK1. The second control unit 1423 includes a twelfth transistor T12 and a thirteenth transistor T13. A gate of the twelfth transistor T12 is electrically connected to the second clock signal terminal CK2, a first electrode of the twelfth transistor T12 is electrically connected to the fourth node N4, a second electrode of the twelfth transistor T12 is electrically connected to a first electrode of the thirteenth transistor T13, a gate of the thirteenth transistor T13 is electrically connected to the fifth node N5, and a second electrode of the thirteenth transistor T12 is electrically connected to the second level signal receiving terminal VGH. The output unit 1424 includes a fourteenth transistor T14, a fifteenth transistor T15, a sixteenth transistor T16, a first capacitor Cl, and a second capacitor C2. A gate of the fourteenth transistor T14 is electrically connected to the first level signal receiving terminal VGL, a first electrode of the fourteenth transistor T14 is electrically connected to the fourth node N4, a second electrode of the fourteenth transistor T14 is electrically connected to a first electrode of the first capacitor Cl and a gate of the fifteenth transistor T15, a second electrode of the first capacitor Cl, a second electrode of the fifteenth transistor T15, and a first electrode of the sixteenth transistor T16 are all electrically connected to the first node N1, a first electrode of the fifteenth transistor T15 is electrically connected to the second clock signal terminal CK2, a gate of the sixteenth transistor T16 and a first electrode of the second capacitor C2 are both electrically connected to the fifth node N5, and a second electrode of the sixteenth transistor T16 and a second electrode of the second capacitor C2 are electrically connected to the second level signal receiving terminal VGH.

The structure of the scan driving unit ASG2 of the second scan driving circuit 142 is described in detail above. A working process of the scan driving unit ASG2 of the second scan driving circuit 142 is described below.

Figure 7:
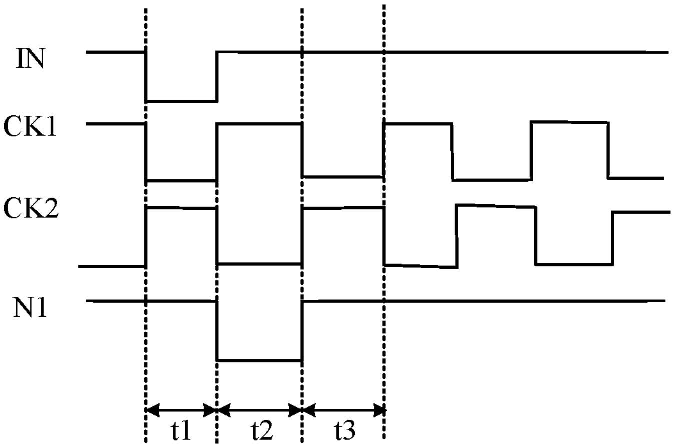
FIG. 7 is a schematic timing diagram of a second scan driving unit according to an embodiment of this application.

FIG. 7 is a timing diagram of signals in a scan driving unit of a second scan driving circuit. The working process of the scan driving unit of the second scan driving circuit shown in FIG. 6 is described below with reference to the timing diagram. A description is provided by using an example in which the ninth transistor T9, the tenth transistor T10, the eleventh transistor T11, the twelfth transistor T12, the thirteenth transistor T13, the fourteenth transistor T14, the fifteenth transistor T15, and the sixteenth transistor T16 are P-type transistors, the first level signal received by the first level signal receiving terminal VGL is a low-level signal, and the second level signal received by the second level signal receiving terminal VGH is a high-level signal.

In a first stage t1, that is, a low-level input stage of the triggering signal, the first clock signal received by the first clock signal terminal CK1 changes from a high level to a low level, the second clock signal received by the second clock signal terminal CK2 changes from a low level to a high level, the ninth transistor T9 and the tenth transistor T10 are turned on, a low level of an input signal received by the triggering signal input terminal IN is written into the fourth node N4, the fourth node N4 is pulled down, the eleventh transistor T11 is turned on, the fifth node N5 is at a low level, the twelfth transistor T12 is turned off, and therefore a high level cannot be written into the fourth node N4 through the twelfth transistor T12, the low level of the fourth node N4 causes the fifteenth transistor T15 to be turned on, the low level of the fifth node N5 causes the sixteenth transistor T16 to be turned on, and the second scan signal outputted by the first node N1 in this case is at a high level.

In a second stage t2, that is, a low-level output stage of an output terminal (the first node N1), the first clock signal received by the first clock signal terminal CK1 changes from the low level to the high level, the second clock signal received by the second clock signal terminal CK2 changes from the high level to the low level, the ninth transistor T9 and the tenth transistor T10 are turned off, the fourth node N4 remains at the low level, the eleventh transistor T11 is still on, the high level of the first clock signal is written into the fifth node N5, the low level of the fourth node N4 causes the fifteenth transistor T15 to be turned on, the high level of the fifth node N5 causes the sixteenth transistor T16 to be turned off, the low level of the second clock signal is transmitted to the first node N1 through the fifteenth transistor T15. In this case, the second scan signal outputted by the first node N1 is at a low level, to drive P-type transistors (the reset transistor M5 and the data writing transistor M2) of the pixel driving circuit 111 in the corresponding pixel row (a row corresponding to the second scan signal line 122 electrically connected to the scan driving unit ASG2 of the level) to be turned on (that is, to work).

In a third stage t3, that is, a high-level output stage of the output terminal (the first node N1), the first clock signal received by the first clock signal terminal CK1 changes from the high level to the low level, the second clock signal received by the second clock signal terminal CK2 changes from the low level to the high level, the ninth transistor T9 is turned on, the tenth transistor T10 is turned on, a high level of the input signal STV received by the triggering signal input terminal IN is written into the fourth node N4, the eleventh transistor T11 is turned off, the low level received by the first level signal receiving terminal VGL is written into the fifth node N5, the twelfth transistor T12 is turned off, and therefore a high level cannot be written into the fourth node N4 through the twelfth transistor T12, the high level of the fourth node N4 causes the fifteenth transistor T15 to be turned off, the low level of the fifth node N5 causes the sixteenth transistor T16 to be turned on, the second scan signal outputted by the first node N1 in this case is at a high level, and correspondingly; the P-type transistors (the reset transistor M5 and the data writing transistor M2) of the pixel driving circuit 111 in the corresponding pixel row are turned off.

In summary, the above second scan driving circuit 142 composed of the eight transistors and the two capacitors provides the second scan signal to the P-type transistors (the reset transistor M5 and the data writing transistor M2) of the pixel driving circuit 111 through the second scan signal line 122, to control the on and off of the reset transistor M5 and the data writing transistor M2. The structure is simple. In addition, because the clock signal is a square wave signal, which is periodic, and includes a high-level signal and a low-level signal within one period, when the signal of the first node is the second clock signal and the second clock signal (a high-level signal or a low-level signal) is an effective level signal (which means that the signal can enable some of transistors in a pixel corresponding to the signal to be turned on after passing through the gating logic module and the output module), signals outputted by first nodes of two adjacent scan driving units may be prevented from overlapping through non-overlapping arrangement of effective signals of two adjacent rows, that is, the second scan signals outputted to the corresponding pixel row do not overlap. When the second scan driving circuit 142 is applied to a partial refreshing technology, a good display effect at a junction of two regions with different refresh rates can be ensured.

The specific structure of the second scan driving circuit 142 (that is, a driving circuit configured to drive P-type transistors of the pixel driving circuit 111 to be turned on or off) and the principle of controlling the on or off of the P-type transistors (the reset transistor M5 and the data writing transistor M2) are described above. A specific structure of the first scan driving circuit 141 (that is, a driving circuit configured to drive the N-type transistors of the pixel driving circuit 111 to be turned on or off) and a principle of implementing on or off of the N-type transistors (the reset transistor M4 and the threshold compensation transistor M3) are described below.

Figure 8:
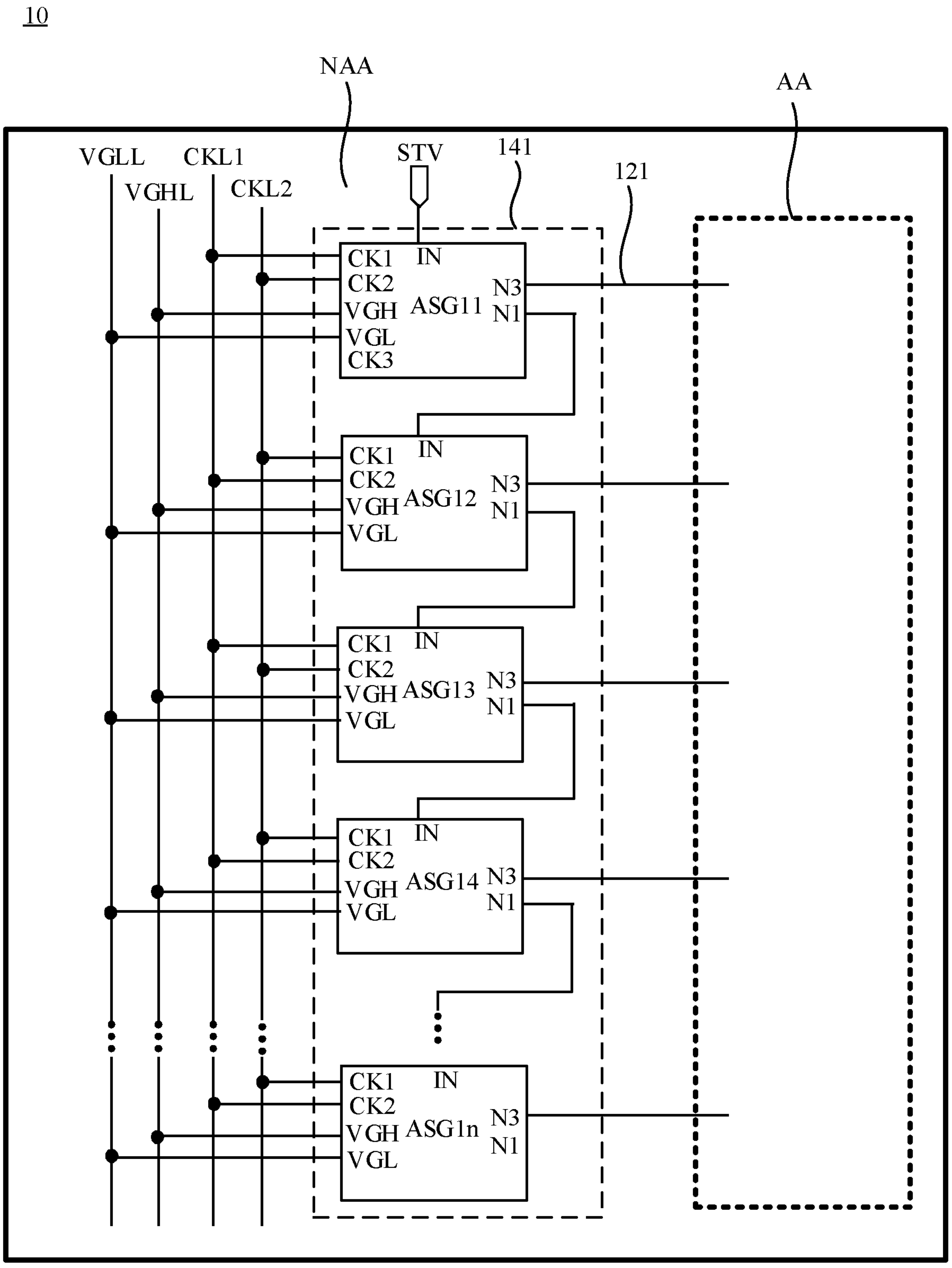
FIG. 8 is a schematic structural diagram of another display panel according to an embodiment of this application.
Figure 9:
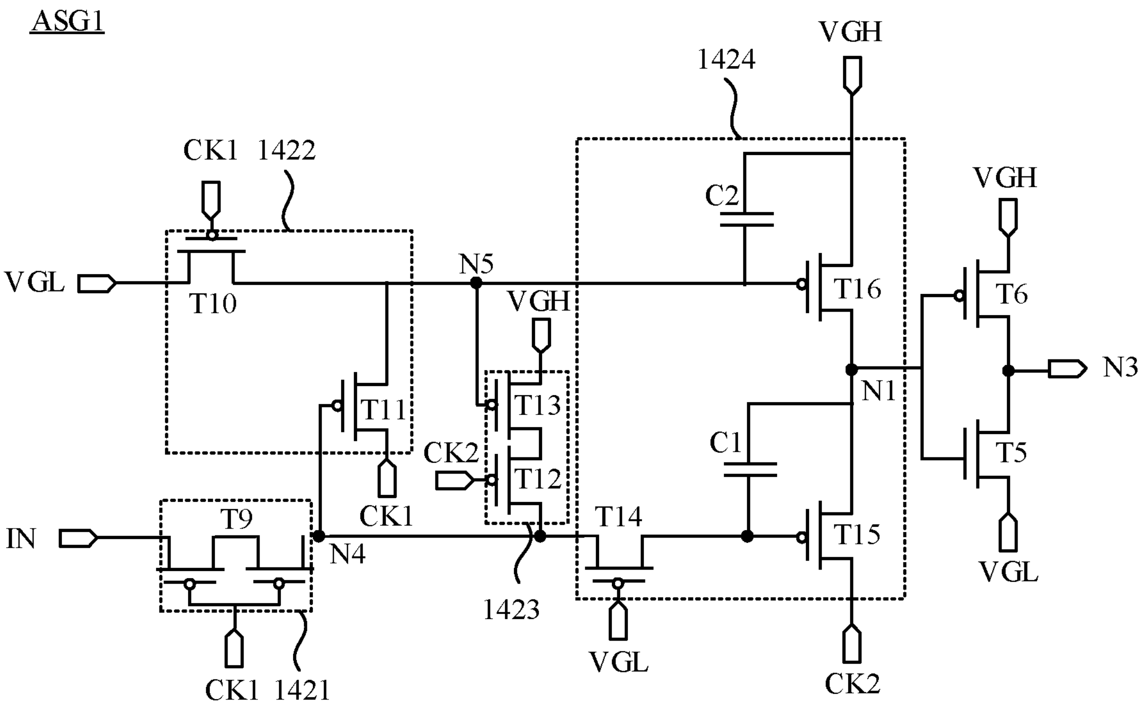
FIG. 9 is a schematic structural diagram of a first scan driving unit according to an embodiment of this application.

Referring to FIG. 8 and FIG. 9, the first scan driving circuit 141 includes N cascaded scan driving units ASG1, for example, may include N scan driving units ASG11 to ASG1*n*, where N≥2. A person skilled in the art may set a specific value of N based on an actual case. This is not limited herein.

Different from the second scan driving circuit 142, the scan driving unit ASG1 of each level of the first scan driving circuit 141 further includes a third node N3 in addition to the first clock signal terminal CK1, the second clock signal terminal CK2, the triggering signal input terminal IN, the first level signal receiving terminal VGL, the second level signal receiving terminal VGH, and the first node N1. The third node N3 serves as an output terminal, which is configured to provide a first scan signal to the first scan signal line 121. In addition, a first node N1 of the scan driving unit ASG1 of each level other than a scan driving unit ASG1*n* of a last level is electrically connected to a triggering signal input terminal IN of a scan driving unit ASG1 of an adjacent next level. A triggering signal input terminal IN of a scan driving unit ASG11 of a first level is electrically connected to a triggering signal line STV, to receive a triggering signal sent by the triggering signal line STV.

With reference to FIG. 9, in addition to the input unit 1421, the first control unit 1422, the second control unit 1423, and the output unit 1424, the scan driving unit ASG1 of the first scan driving circuit 141 further includes a first inversion unit 1425. For specific structures of the input unit 1421, the first control unit 1422, the second control unit 1423, and the output unit 1424, refer to the above content, and the details are not described herein again. The first inversion unit 1425 includes a fifth transistor T5 and a sixth transistor T6. A type of the fifth transistor T5 is different from that of the sixth transistor T6. In an example, the fifth transistor T5 is an N-type transistor, and the sixth transistor T6 is a P-type transistor. A gate of the fifth transistor T5 and a gate of the sixth transistor T6 are both electrically connected to the first node N1, a first electrode of the fifth transistor T5 is electrically connected to the first level signal receiving terminal VGL, a second electrode of the fifth transistor T5 and a first electrode of the sixth transistor T6 are both electrically connected to the third node N3, and a second electrode of the sixth transistor T6 is electrically connected to the second level signal receiving terminal VGH.

To be specific, the scan driving unit ASG1 of the first scan driving circuit 141 is provided with the first inversion unit 1425 based on the scan driving unit ASG2 of the second scan driving circuit 142, to invert the signal of the first node N1, so that the first scan signal outputted by the third node N3 is inverse to the second scan signal, thereby turning on or off the N-type transistors (the reset transistor M4 and the threshold compensation transistor M3) of the pixel driving circuit in the corresponding pixel row.

The structure of the scan driving unit ASG1 of the first scan driving circuit 141 is described in detail above. A working process of the scan driving unit ASG1 of the first scan driving circuit 141 is described below.

Figure 10:
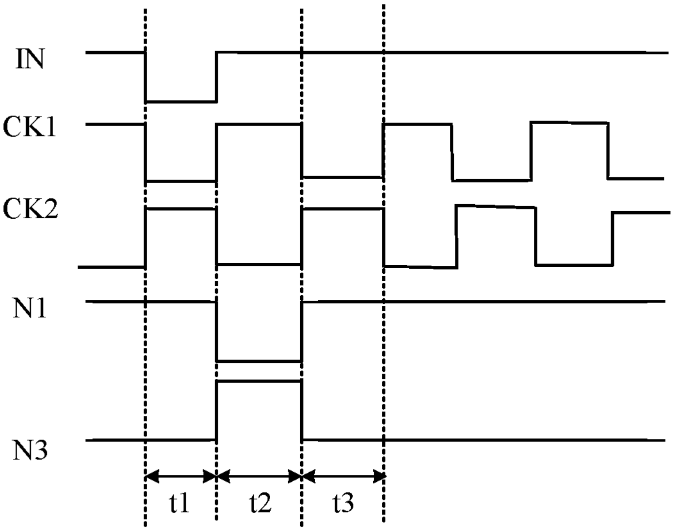
FIG. 10 is a schematic timing diagram of a first scan driving unit according to an embodiment of this application.

FIG. 10 is a timing diagram of signals in a scan driving unit of a first scan driving circuit. The working process of the scan driving unit of the first scan driving circuit shown in FIG. 9 is described below with reference to the timing diagram of the signals in the scan driving unit of the first scan driving unit. A description is provided by using an example in which the ninth transistor T9, the tenth transistor T10, the eleventh transistor T11, the twelfth transistor T12, the thirteenth transistor T13, the fourteenth transistor T14, the fifteenth transistor T15, the sixteenth transistor T16, and the sixth transistor T6 are P-type transistors, the fifth transistor T5 is an N-type transistor, the first level signal received by the first level signal receiving terminal VGL is a low-level signal, and the second level signal received by the second level signal receiving terminal VGH is a high-level signal.

In a first stage t1, that is, a low-level input stage of the triggering signal, the first clock signal received by the first clock signal terminal CK1 changes from a high level to a low level, the second clock signal received by the second clock signal terminal CK2 changes from a low level to a high level, the ninth transistor T9 is turned on, the tenth transistor T10 is turned on, a low level of an input signal STV received by the triggering signal input terminal IN is written into the fourth node N4, the fourth node N4 is pulled down, the eleventh transistor T11 is turned on, the fifth node N5 is at a low level, the twelfth transistor T12 is turned off, and therefore a high level cannot be written into the fourth node N4 through the twelfth transistor T12, the low level of the fourth node N4 causes the fifteenth transistor T15 to be turned on, the low level of the fifth node N5 causes the sixteenth transistor T16 to be turned on, a signal of the first node N1 is at a high level, the high level causes the fifth transistor T5 to be turned on and the sixth transistor T6 to be turned off, and the first level signal received by the first level signal receiving terminal VGL is transmitted to the third node N3 through the fifth transistor T5, so that the first scan signal outputted by the third node N3 is at a low level.

In a second stage t2, that is, a high-level output stage of an output terminal (the third node N3), the first clock signal received by the first clock signal terminal CK1 changes from the low level to the high level, the second clock signal received by the second clock signal terminal CK2 changes from the high level to the low level, the ninth transistor T9 and the tenth transistor T10 are turned off, the fourth node N4 remains at the low level, the eleventh transistor T11 is still on, the high level of the first clock signal is written into the fifth node N5, the low level of the fourth node N4 causes the fifteenth transistor T15 to be turned on, the high level of the fifth node N5 causes the sixteenth transistor T16 to be turned off, the low level of the second clock signal is transmitted to the first node N1 through the fifteenth transistor T15, that is, the first node N1 is at a low level, the low level causes the sixth transistor T6 to be turned on and the fifth transistor T5 to be turned off, and the second level signal received by the second level signal receiving terminal VGH is transmitted to the third node N3 through the sixth transistor T6, so that the first scan signal outputted by the third node N3 is at a high level, to drive the N-type transistors (the reset transistor M4 and the threshold compensation transistor M3) of the pixel driving circuit 111 in the corresponding pixel row (a row corresponding to the first scan signal line 121 electrically connected to the scan driving unit ASG1 of the level) to be turned on (that is, to work).

In a third stage t3, that is, a low-level output stage of the output terminal (the third node N3), the first clock signal received by the first clock signal terminal CK1 changes from the high level to the low level, the second clock signal received by the second clock signal terminal CK2 changes from the low level to the high level, the ninth transistor T9 is turned on, the tenth transistor T10 is turned on, a high level of the input signal STV received by the triggering signal input terminal IN is written into the fourth node N4, the eleventh transistor T11 is turned off, the low level received by the first level signal receiving terminal VGL is written into the fifth node N5, the twelfth transistor T12 is turned off, and therefore a high level cannot be written into the fourth node N4 through the twelfth transistor T12, the high level of the fourth node N4 causes the fifteenth transistor T15 to be turned off, the low level of the fifth node N5 causes the sixteenth transistor T16 to be turned on, the signal of the first node N1 is at a high level, the high level causes the fifth transistor T5 to be turned on and the sixth transistor T6 to be turned off, and the first level signal received by the first level signal receiving terminal VGL is transmitted to the third node N3 through the fifth transistor T5, so that the first scan signal outputted by the third node N3 is at a low level. In this case, the N-type transistors (the reset transistor M4 and the threshold compensation transistor M3) of the pixel driving circuit 111 in the corresponding pixel row are turned off.

In summary; the scan driving unit ASG1 of the first scan driving circuit 141 providing the first scan signal (the signal may control the on or off of the reset transistor M4 and the threshold compensation transistor M3) adopts the scan driving unit ASG2 and the inversion unit of the second scan driving circuit 142 providing the second scan signal (the signal may control on or off of the reset transistor M5 and the data writing transistor M2), to replace the existing scan driving unit ASG1. Because the existing scan driving unit ASG1 is generally 13T3C (that is, thirteen transistors and three capacitors) or 16T3C (that is, sixteen transistors and three capacitors), which has a relatively complex structure, occupies a relatively large region of the non-display region, and impedes a narrow bezel design of the display panel. However, the scan driving unit ASG1 and the first scan driving circuit 141 in embodiments of this application have a simple structure, save a space, and facilitate the narrow bezel design of the display panel. In addition, in the first scan driving circuit provided in embodiments of this application, first scan signals outputted by two adjacent scan driving units ASG1 do not overlap. When the scan driving circuit is applied to a partial refreshing technology, a good display effect at a junction of two regions with different refresh rates can be ensured.

It should be noted that, FIG. 5, FIG. 6, and FIG. 7 merely show the second scan driving circuit providing the second scan signal. However, the scan driving circuit providing the second scan signal is not limited thereto. A person skilled in the art may arrange the scan driving circuit providing the second scan signal based on an actual case, as long as the second scan signal can be provided. In this way, the on or off of the P-type transistors (the reset transistor M5 and the data writing transistor M2) of the pixel driving circuit 111 can be controlled. Correspondingly, the first scan driving circuit in the application may be formed by another second scan driving circuit and another inversion unit. Any first scan driving circuit providing the first scan signal formed by a scan driving circuit providing the second scan signal and an inversion unit falls within the protection scope of this application.

Figure 11:
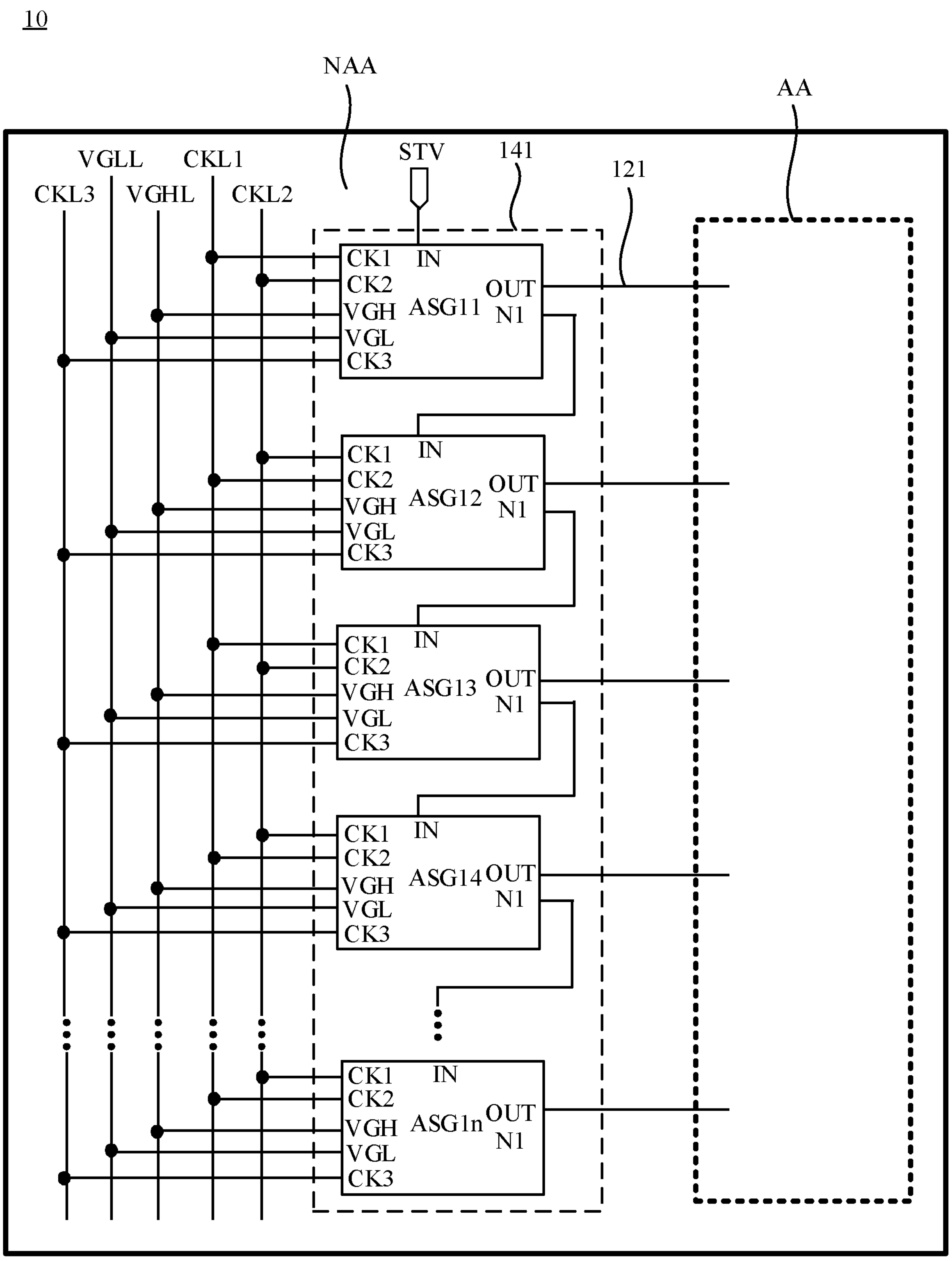
FIG. 11 is a schematic structural diagram of another display panel according to an embodiment of this application.
Figure 12:
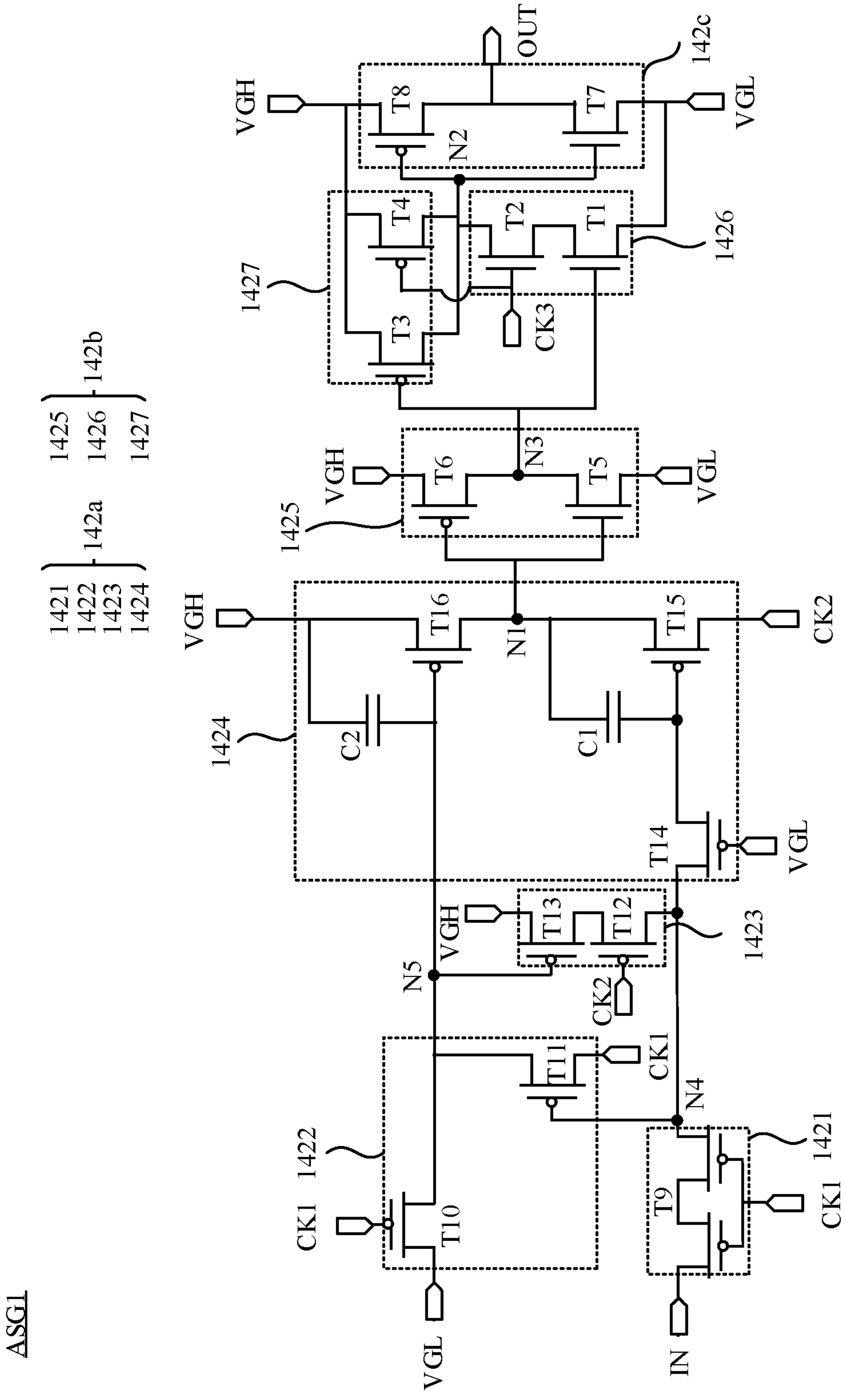
FIG. 12 is a schematic structural diagram of another first scan driving unit according to an embodiment of this application.

In this case, to achieve control of the refresh rates of the different regions of the display panel, an embodiment of this application further provides a first scan driving circuit. Referring to FIG. 11 and FIG. 12, a first scan driving circuit 141 includes N cascaded scan driving units ASG1, for example, may include N scan driving units ASG11 to ASG1*n*, where N≥2. A person skilled in the art may set a specific value of N based on an actual case. This is not limited herein.

Different from the first scan driving circuit 141 shown in FIG. 8 and FIG. 9, in addition to the first clock signal terminal CK1, the second clock signal terminal CK2, the triggering signal input terminal IN, the first level signal receiving terminal VGL, the second level signal receiving terminal VGH, the first node N1, and the third node N3 (not shown in FIG. 11), the scan driving unit ASG1 of each level of the first scan driving circuit 141 further includes a region gating control terminal CK3 and a driving signal output terminal OUT. The driving signal output terminal OUT serves as an output terminal, and is configured to provide a first scan signal to the first scan signal line 121. A region gating signal received by the region gating control terminal CK3 may control whether to apply the first scan signal outputted by the first scan driving circuit 141 to a pixel 11 in a corresponding row. A first node N1 of a scan driving unit ASG1 of each level other than a scan driving unit ASG1*n* of a last level is electrically connected to a triggering signal input terminal IN of a scan driving unit ASG1 of an adjacent next level. A triggering signal input terminal IN of a scan driving unit ASG11 of a first level is electrically connected to the triggering signal line STV, to receive a triggering signal sent by the triggering signal line STV.

With reference to FIG. 12, in addition to the input unit 1421, the first control unit 1422, the second control unit 1423, the output unit 1424, and the first inversion unit 1425, the scan driving unit ASG1 of the first scan driving circuit 141 further includes a first region gating unit 1426 and a second region gating unit 1427. For specific structures of the input unit 1421, the first control unit 1422, the second control unit 1423, the output unit 1424, and the first inversion unit 1425, refer to the above content, and the details are not described herein again. The input unit 1421, the first control unit 1422, the second control unit 1423, and the output unit 1424 form a shifting module 142*a*, and the first inversion unit 1425, the first region gating unit 1426, and the second region gating unit 1427 form a gating logic module 142*b*. The scan driving unit ASG1 of the first scan driving circuit 141 further includes an output module 142*c*.

The first region gating unit 1426 includes a first transistor T1 and a second transistor T2. The second region gating unit 1427 includes a third transistor T3 and a fourth transistor T4. A first electrode of the first transistor T1 is electrically connected to the first level signal receiving terminal VGL, a second electrode of the first transistor T1 is electrically connected to a first electrode of the second transistor T2, a second electrode of the second transistor T2, a first electrode of the third transistor T3, and a first electrode of the fourth transistor T4 are all coupled to the second node N2, and a second electrode of the third transistor T3 and a second electrode of the fourth transistor T4 are both electrically connected to the second level signal receiving terminal VGH. A gate of the first transistor T1 is coupled to a gate of the third transistor T3, and a gate of the second transistor T2 is coupled to a gate of the fourth transistor T4. Ones of the gates of the first transistor and the third transistor and the gates of the second transistor and the fourth transistor are coupled to the third node N3, and the others thereof are coupled to the region gating control terminal CK3. In an example, the gate of the first transistor T1 and the gate of the third transistor T3 are coupled to the third nodes N3, and the gate of the second transistor T2 and the gate of the fourth transistor T4 are coupled to the region gating control terminal CK3. In an example, the first transistor T1 and the second transistor T2 are both N-type transistors, and the third transistor T3 and the fourth transistor T4 are both P-type transistors.

The output module 142*c* includes a second inversion unit, and the second inversion unit includes a seventh transistor T7 and an eighth transistor T8. A type of the seventh transistor T7 is different from that of the eighth transistor T8. In an example, the seventh transistor T7 is an N-type transistor, and the eighth transistor T8 is a P-type transistor. A gate of the seventh transistor T7 and a gate of the eighth transistor T8 are both electrically connected to the second node N2, a first electrode of the seventh transistor T7 is electrically connected to the first level signal receiving terminal VGL, a second electrode of the seventh transistor T7 and a first electrode of the eighth transistor T8 are both electrically connected to the driving signal output terminal OUT, and a second electrode of the eighth transistor T8 is electrically connected to the second level signal receiving terminal VGH.

To be specific, the scan driving unit ASG1 shown in FIG. 12 is provided with the first region gating unit 1426, the second region gating unit 1427, and the output module 142*c* based on the scan driving unit ASG1 shown in FIG. 9, to perform logical processing on a signal of the third node N3, and control whether to apply the signal of the third node N3 to the pixel 11 in the corresponding row. After it is determined that a data signal of the pixel 11 in the corresponding row needs to be refreshed, the first scan signal outputted by the first scan driving unit ASG1 may be provided to the N-type transistors of the pixel 11 that needs to be refreshed through control of the first region gating unit 1426, the second region gating unit 1427, and the output module 142*c*, and the first scan signal is not provided to a pixel 11 that does not need to be refreshed.

The structure of the scan driving unit ASG1 of the first scan driving circuit 141 (which can achieve control of the refresh rates of the different regions of the display panel) is described in detail above. A working process of the scan driving unit ASG1 of the first scan driving circuit 141 is described below.

Figure 13:
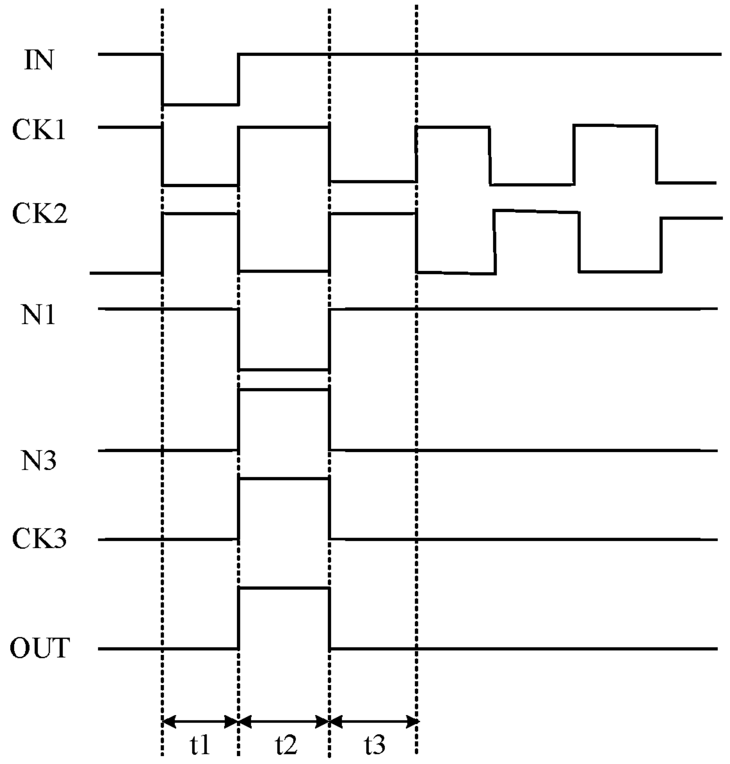
FIG. 13 is a schematic timing diagram of another first scan driving unit according to an embodiment of this application.

FIG. 13 is a timing diagram of signals in a scan driving unit of a first scan driving circuit. The working process of the scan driving unit shown in FIG. 12 is described below with reference to the timing diagram of the signals in the scan driving unit of the first scan driving circuit. A description is provided by using an example in which the ninth transistor T9, the tenth transistor T10, the eleventh transistor T11, the twelfth transistor T12, the thirteenth transistor T13, the fourteenth transistor T14, the fifteenth transistor T15, the sixteenth transistor T16, the sixth transistor T6, the third transistor T3, the fourth transistor T4, and the eighth transistor T8 are P-type transistors, the first transistor T1, the second transistor T2, the fifth transistor T5, and the seventh transistor T7 are N-type transistors, the first level signal received by the first level signal receiving terminal VGL is a low-level signal, and the second level signal received by the second level signal receiving terminal VGH is a high-level signal.

In a first stage t1, that is, a low-level input stage of the triggering signal, the first clock signal received by the first clock signal terminal CK1 changes from a high level to a low level, the second clock signal received by the second clock signal terminal CK2 changes from a low level to a high level, the ninth transistor T9 is turned on, the tenth transistor T10 is turned on, a low level of an input signal STV received by the triggering signal input terminal IN is written into the fourth node N4, the fourth node N4 is pulled down, the eleventh transistor T11 is turned on, the fifth node N5 is at a low level, the twelfth transistor T12 is turned off, and therefore a high level cannot be written into the fourth node N4 through the twelfth transistor T12, the low level of the fourth node N4 causes the fifteenth transistor T15 to be turned on, the low level of the fifth node N5 causes the sixteenth transistor T16 to be turned on, a signal of the first node N1 is at a high level, the high level causes the fifth transistor T5 to be turned on and the sixth transistor T6 to be turned off, the low level received by the first level signal receiving terminal VGL is transmitted to the third node N3 through the fifth transistor T5, and the low level causes the first transistor T1 to be turned off and the third transistor T3 to be turned on. In addition, the region gating signal is at a low level, which causes the second transistor T2 to be turned off and the fourth transistor T4 to be turned on. The second level signal received by the second level signal receiving terminal VGH is written into the second node N2 through the third transistor T3 and the fourth transistor T4. The high level of the second node N2 causes the seventh transistor T7 to be turned on and the eighth transistor T8 to be turned off. The driving signal output terminal OUT outputs a low level. If a current level of the third node N3 is a high level, after the high level passes through the first inversion unit 1425, the first region gating unit 1426, the second region gating unit 1427, and a second inversion unit 142*c*, the level outputted by the driving signal output terminal OUT is still a low level. To be specific, in the first stage t1, regardless of whether the signal of the third node N3 is at the high level or the low level, when the region gating signal of the region gating control terminal CK3 remains as a low-level signal, the driving signal output terminal OUT outputs the low level. In this case, the driving signal output terminal OUT cannot perform scan driving on the N-type transistors (the reset transistor M4 and the threshold compensation transistor M3) of the pixel 111, and therefore the pixel cannot be refreshed.

In a second stage t2, that is, a high-level output stage of an output terminal (the third node N3), the first clock signal received by the first clock signal terminal CK1 changes from the low level to the high level, the second clock signal received by the second clock signal terminal CK2 changes from the high level to the low level, the ninth transistor T9 and the tenth transistor T10 are turned off, the fourth node N4 remains at the low level, the eleventh transistor T11 is still on, the high level of the first clock signal is written into the fifth node N5, the low level of the fourth node N4 causes the fifteenth transistor T15 to be turned on, the high level of the fifth node N5 causes the sixteenth transistor T16 to be turned off, the low level of the second clock signal is transmitted to the first node N1 through the fifteenth transistor T15, that is, the first node N1 is at a low level, the low level causes the sixth transistor T6 to be turned on and the fifth transistor T5 to be turned off, the high level signal received by the second level signal receiving terminal VGH is transmitted to the third node N3 through the sixth transistor T6, and the high level causes the first transistor T1 to be turned on and the third transistor T3 to be turned off. In addition, the region gating signal is at a high level, which causes the second transistor T2 to be turned on and the fourth transistor T4 to be turned off. The low-level signal received by the first level signal receiving terminal VGL is written into the second node N2 through the first transistor T1 and the second transistor T2. The low level of the second node N2 causes the seventh transistor T7 to be turned off and the eighth transistor T8 to be turned on. The driving signal output terminal OUT outputs a high level, to perform scan driving on the N-type transistors (the reset transistor M4 and the threshold compensation transistor M3) of the pixel 111, thereby achieving refreshing.

In a third stage t3, that is, a low-level output stage of the output terminal (the third node N3), the first clock signal received by the first clock signal terminal CK1 changes from the high level to the low level, the second clock signal received by the second clock signal terminal CK2 changes from the low level to the high level, the ninth transistor T9 is turned on, the tenth transistor T10 is turned on, a high level of the input signal STV received by the triggering signal input terminal IN is written into the fourth node N4, the eleventh transistor T11 is turned off, the low level received by the first level signal receiving terminal VGL is written into the fifth node N5, the twelfth transistor T12 is turned off, and therefore a high level cannot be written into the fourth node N4 through the twelfth transistor T12, the high level of the fourth node N4 causes the fifteenth transistor T15 to be turned off, the low level of the fifth node N5 causes the sixteenth transistor T16 to be turned on, the signal of the first node N1 is at a high level, the high level causes the fifth transistor T5 to be turned on and the sixth transistor T6 to be turned off, and the first level signal received by the first level signal receiving terminal VGL is transmitted to the third node N3 through the fifth transistor T5, and the low level causes the first transistor T1 to be turned off and the third transistor T3 to be turned on. In addition, the region gating signal is at a low level, which causes the second transistor T2 to be turned off and the fourth transistor T4 to be turned on. The second level signal received by the second level signal receiving terminal VGH is written into the second node N2 through the third transistor T3 and the fourth transistor T4. The high level of the second node N2 causes the seventh transistor T7 to be turned on and the eighth transistor T8 to be turned off. The driving signal output terminal OUT outputs a low level. The low level outputted by the driving signal output terminal OUT cannot drive the N-type transistors (the reset transistor M4 and the threshold compensation transistor M3) of the pixel 111, and therefore refreshing of the reset transistor M4 and the threshold compensation transistor M3 is completed.

Figure 14:
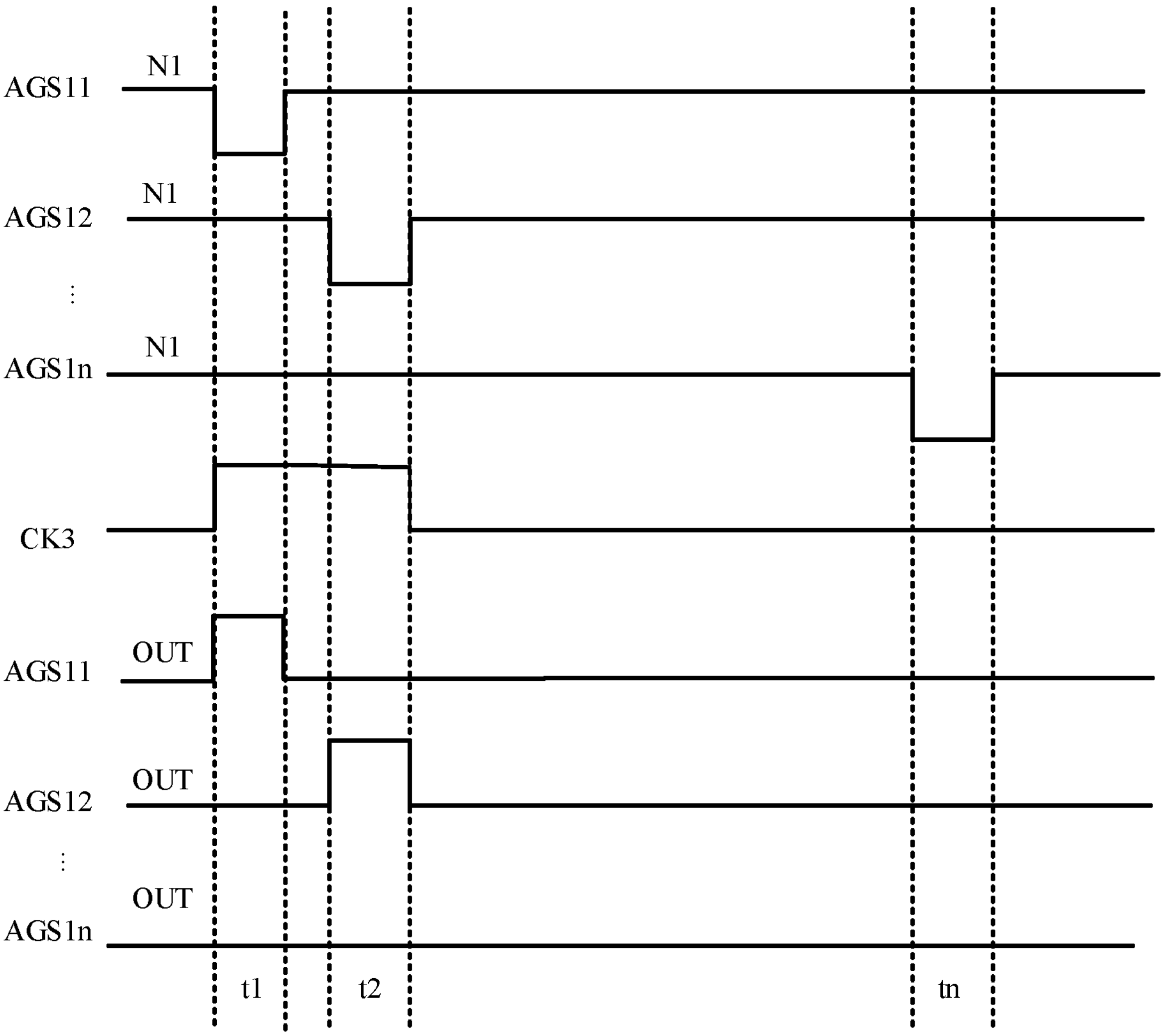
FIG. 14 is a schematic timing diagram of a first scan driving circuit according to an embodiment of this application.

With reference to FIG. 11 and FIG. 14, FIG. 14 is a timing diagram of a region gating signal, signals at first nodes of first scan driving units respectively corresponding to rows of pixels, and first scan signal outputted by driving signal output terminals OUT respectively corresponding to the rows of pixels. The region gating signal of the region gating control terminal CK3 is at a high level at moments t1 and t2. In this case, the first scan signal outputted by the driving signal output terminal OUT of the scan driving unit AGS11 of the first level of the first scan driving circuit 141 has a waveform opposite to that of the signal of the first node N1 in the scan driving unit AGS11 of the first level of the first scan driving circuit 141. To be specific, the signal outputted by the driving signal output terminal OUT is at a high level, to drive N-type transistors (the reset transistor M4 and the threshold compensation transistor M3) of a pixel 111 in a first row to be turned on, so as to complete refreshing of the reset transistor M4 and the threshold compensation transistor M3. In addition, the first scan signal outputted by the driving signal output terminal OUT of the scan driving unit AGS12 of the second level of the first scan driving circuit 141 has a waveform opposite to that of the signal of the first node N1 in the scan driving unit AGS12 of the second level of the first scan driving circuit 141, to drive N-type transistors (the reset transistor M4 and the threshold compensation transistor M3) of a pixel 111 in a second row to be turned on, so as to complete refreshing of the reset transistor M4 and the threshold compensation transistor M3. The region gating signal of the region gating control terminal CK3 is at a low level at moments t3 to tn. In this case, first scan signals outputted by the driving signal output terminals OUT of the scan driving unit AGS13 of the third level of the first scan driving circuit 141 to a scan driving unit AGS1n of an nth level are at a low level, which cannot drive the N-type transistors (the reset transistor M4 and the threshold compensation transistor M3) of the pixel 111 in the first row to be turned on, and therefore the reset transistor M4 and the threshold compensation transistor M3 cannot be refreshed. Therefore, a data signal of the pixel 11 in the first row is refreshed through the first scan signal (at the high level) outputted by the first level scan driving unit AGS11, a data signal of the pixel 11 in the second row is refreshed through the first scan signal (at the high level) outputted by the second level scan driving unit AGS12, and data signals of a pixel 11 in a third row to a pixel 11 in an nth row cannot be refreshed through the first scan signals (at the low level) outputted by the scan driving unit AGS 13 of the third level to the scan driving unit AGS In of the nth level, which remain at a data signal of a previous frame. In this way, refresh rates of the pixels 11 in the first row and the second row are different from those of the pixels 11 in the third row to the nth row.

It should be understood that, FIG. 14 is merely an example showing how to control whether to refresh the pixels 11 in the rows through the region gating signal and control the refresh rates of the pixels in the rows. In an actual application, waveforms and timing of the signals in FIG. 14 are not limited to those shown in FIG. 14.

It may be learned that, in the first scan driving circuit provided in this embodiment of this application, each scan driving unit is further provided with the gating logic module and the output module based on the second scan driving circuit, which has a simple structure, saves a space, and facilitates the narrow bezel design of the display panel. In addition, through joint action of the shifting module, the gating logic module, and the output module, the first scan driving circuit provided in this embodiment of this application can achieve different refresh rates for the different regions of the display panel, and resolve a problem of waveform losses between rows, thereby ensuring a good display effect at a junction of two regions with different refresh rates.

It should be noted that, the structure of the gating logic module is not limited to the above examples. A person skilled in the art may arrange the gating logic module based on an actual case. Any first scan driving circuit formed through arrangement of another structure based on the second scan driving circuit falls within the protection range of this application. The first scan driving circuit can achieve control of refresh rates of different regions of the display panel.

Figure 15:
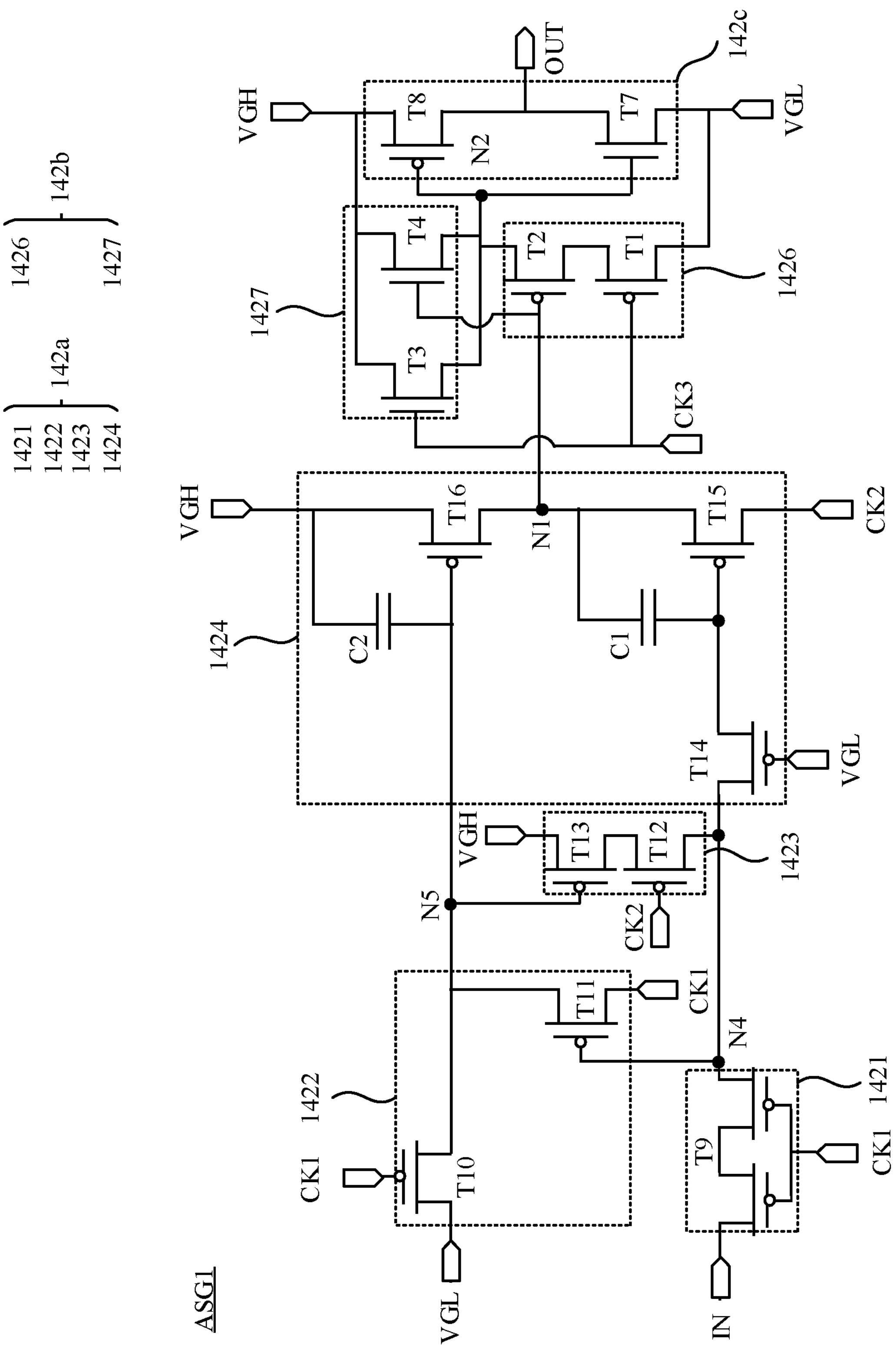
FIG. 15 is a schematic structural diagram of another first scan driving unit according to an embodiment of this application.

In other optional embodiments of this application, the gating logic module may alternatively include only the first region gating unit and the second region gating unit. In an example, referring to FIG. 15, the first region gating unit 1426 includes a first transistor T1 and a second transistor T2, and the second region gating unit 1427 includes a third transistor T3 and a fourth transistor T4. A first electrode of the first transistor T1 is electrically connected to the first level signal receiving terminal VGL, a second electrode of the first transistor T1 is electrically connected to a first electrode of the second transistor T2, a second electrode of the second transistor T2, a first electrode of the third transistor T3, and a first electrode of the fourth transistor T4 are all coupled to the second node N2, and a second electrode of the third transistor T3 and a second electrode of the fourth transistor T4 are both electrically connected to the second level signal receiving terminal VGH. A gate of the first transistor T1 is coupled to a gate of the third transistor T3, and a gate of the second transistor T2 is coupled to a gate of the fourth transistor T4. Ones of the gates of the first transistor and the third transistor and the gates of the second transistor and the fourth transistor are coupled to the third node N3, and the others are coupled to the region gating control terminal CK3. In an example, the gate of the first transistor T1 and the gate of the third transistor T3 are coupled to the region gating control terminal CK3, and the gate of the second transistor T2 and the gate of the fourth transistor T4 are coupled to the first node N1. In an example, the first transistor T1 and the second transistor T2 are both P-type transistors, and the third transistor T3 and the fourth transistor T4 are both N-type transistors.

Figure 16:
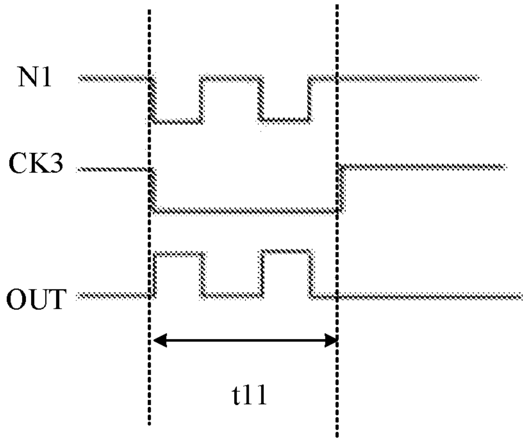
FIG. 16 is a schematic timing diagram of another first scan driving unit according to an embodiment of this application.

FIG. 16 is a timing diagram of a region gating signal and a signal and a first scan signal of a first node. A working process of the first scan driving unit shown in FIG. 14 is described below with reference to the timing diagram. A description is provided by using an example in which the ninth transistor T9, the tenth transistor T10, the eleventh transistor T11, the twelfth transistor T12, the thirteenth transistor T13, the fourteenth transistor T14, the fifteenth transistor T15, the sixteenth transistor T16, the first transistor T1, the second transistor T2, and the eighth transistor T8 are P-type transistors, the third transistor T3, the fourth transistor T4, and the seventh transistor T7 are N-type transistors, the first level signal received by the first level signal receiving terminal VGL is a low-level signal, and the second level signal received by the second level signal receiving terminal VGH is a high-level signal.

During a time period t11, the region gating signal of the region gating control terminal CK3 is a low-level signal, the first transistor T1 is turned on, and the third transistor T3 is turned off. When the signal of the first node N1 is at a low level, the second transistor T2 is turned on, the fourth transistor T4 is turned off, and the signal of the second node N2 is at a low level. After the signal passes through the second inversion unit 142*c*, the second transistor T2 is turned on, and the signal outputted by the driving signal output terminal OUT is at a high level. When the signal of the first node N1 is at a high level, the fourth transistor T4 is turned on, the second transistor T2 is turned off, and the signal at the second node N2 is at a high level. After the signal passes through the second inversion unit 142*c*, the second transistor T2 is turned on, and the signal outputted by the driving signal output terminal OUT is at a low level. To be specific, through arrangement of the region gating signal, a waveform of the signal outputted by the driving signal output terminal OUT is opposite to a waveform of the signal of the first node N1 that is, N-type transistors (the reset transistor M4 and the threshold compensation transistor M3) of a pixel driving circuit 111 of a region selected by the region gating signal are turned on (that is, working), so that the pixel 11 is refreshed.

Figure 17:
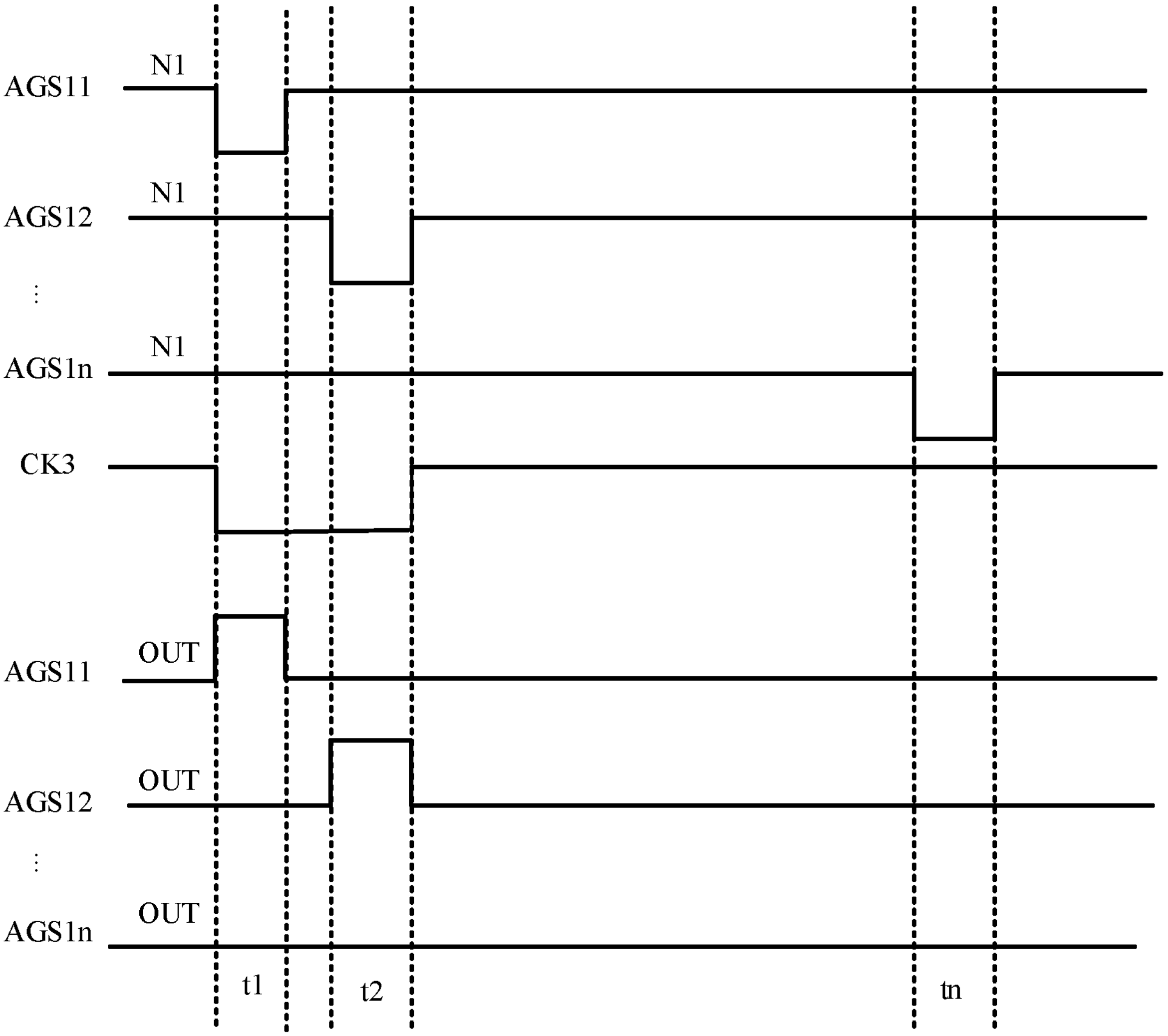
FIG. 17 is a schematic timing diagram of another first scan driving circuit according to an embodiment of this application.

With reference to FIG. 11 and FIG. 17, FIG. 17 is a timing diagram of a region gating signal, signals at first nodes of first scan driving units respectively corresponding to rows of pixels, and first scan signal outputted by driving signal output terminals OUT respectively corresponding to the rows of pixels. The region gating signal of the region gating control terminal CK3 is at a low level at moments t1 and t2. In this case, the first scan signal outputted by the driving signal output terminal OUT of the scan driving unit AGS11 of the first level of the first scan driving circuit 141 has a waveform opposite to that of the signal of the first node N1 in the scan driving unit AGS11 of the first level of the first scan driving circuit 141. To be specific, the signal outputted by the driving signal output terminal OUT is at a high level, to drive N-type transistors (the reset transistor M4 and the threshold compensation transistor M3) of a pixel 111 in a first row to be turned on, so as to complete refreshing of the reset transistor M4 and the threshold compensation transistor M3. In addition, the first scan signal outputted by the driving signal output terminal OUT of the scan driving unit AGS12 of the second level of the first scan driving circuit 141 has a waveform opposite to that of the signal of the first node N1 in the scan driving unit AGS12 of the second level of the first scan driving circuit 141, to drive N-type transistors (the reset transistor M4 and the threshold compensation transistor M3) of a pixel 111 in a second row to be turned on, so as to complete refreshing of the reset transistor M4 and the threshold compensation transistor M3. The region gating signal of the region gating control terminal CK3 is at a high level at moments t3 to tn. In this case, first scan signals outputted by the driving signal output terminals OUT of the scan driving unit AGS13 of the third level of the first scan driving circuit 141 to a scan driving unit AGS1n of an nth level are at a low level, which cannot drive the N-type transistors (the reset transistor M4 and the threshold compensation transistor M3) of the pixel 111 in the first row to be turned on, and therefore the reset transistor M4 and the threshold compensation transistor M3 cannot be refreshed. Therefore, a data signal of the pixel 11 in the first row is refreshed through the first scan signal (at the high level) outputted by the first level scan driving unit AGS11, a data signal of the pixel 11 in the second row is refreshed through the first scan signal (at the high level) outputted by the second level scan driving unit AGS12, and data signals of a pixel 11 in a third row to a pixel 11 in an nth row cannot be refreshed through the first scan signals (at the low level) outputted by the scan driving unit AGS 13 of the third level to the scan driving unit AGS In of the nth level, which remain at a data signal of a previous frame. In this way; refresh rates of the pixels 11 in the first row and the second row are different from those of the pixels 11 in the third row to the nth row.

It may be learned that, after the gating logic module 142*b* is added, whether the first scan signal outputted by the first scan driving unit AGS1 acts on the pixel 11 in the corresponding row may be controlled through the region gating signal. In other words, whether the first scan driving unit AGS1 provides the first scan signal to the pixel 11 in the corresponding row may be controlled through the region gating signal. In this way, after it is determined that a data signal of the pixel 11 in the corresponding row needs to be refreshed, the first scan signal outputted by the first scan driving unit AGS1 may be provided to the P-type transistor of the pixel 11 that needs to be refreshed through control of the gating logic module, and the scan signal is not provided to the pixel 11 that does not need to be refreshed.

It should be understood that, FIG. 17 is merely an example showing how to control whether to refresh the pixels 11 in the rows through the region gating signal and control the refresh rates of the pixels in the rows. In an actual application, waveforms and timing of the signals in FIG. 17 are not limited to those shown in FIG. 17.

In summary, it may be learned that, in the display panel 900 shown in FIG. 5 and FIG. 6, the gating logic module 142*b* and the output module 142*c* are added to the scan driving circuit AGS1 of each level of the first scan driving circuit 141 to form the first scan driving circuit 141. Whether the first scan signal generated by the first scan driving circuit 141 is provided to the first scan signal line 121 and the pixel 11 in the corresponding row may be controlled through the region gating signal, thereby controlling whether to refresh data signals of the pixels 11 in each row. If a pixel 11 in a current row does not need to be refreshed, the first scan signal generated by the first scan driving circuit 141 is controlled not to be provided to the first scan signal line 121 and the pixel 11 in the row through the region gating signal, and the pixel 11 in the row remains at the data signal of the previous frame. If the pixel 11 of the current row needs to be refreshed, the first scan signal generated by the first scan driving circuit 141 is controlled to be provided to the first scan signal line 121 and the pixel 11 in the row through the region gating signal, and the pixel 11 of the row is refreshed to a data signal of a current frame. In this way, data signals of pixels 11 of different regions of the display panel 10 can be refreshed at different refresh rates. In other words, the display panel 10 refreshes displayed contents in the different regions at the different refresh rates. For a region in which a constant content such as a picture/a text is displayed, the displayed content may be refreshed at a relatively low refresh rate. For example, the displayed content is refreshed at a refresh rate of 1 Hz or 10 Hz. For a region in which a content changing in real time such as a video is displayed, the displayed content may be refreshed at a relatively high refresh rate. For example, the displayed content is refreshed at a refresh rate of 60 Hz. Because the refresh rates of the regions of the display panel 10 are reduced, power consumption of the display panel is reduced.

The above embodiments are merely intended to describe the technical solutions of this application, and are not intended to limit this application. Although this application is described in detail with reference to the above embodiments, a person skilled in the art should understand that, modifications may still be made to the technical solutions described in the above embodiments, or equivalent replacements may be made to some of the technical features, and these modifications or replacements do not cause the essence of corresponding technical solutions to depart from the scope of the technical solutions in embodiments of this application.

The invention claimed is:

1. A display panel, comprising:

a scan driving circuit including N cascaded scan driving units, wherein N is a positive integer greater than or equal to 2, and wherein the scan driving unit of each level comprises:

a shifting module that is electrically connected to a triggering signal input terminal, a first clock signal terminal, a second clock signal terminal, a first level signal receiving terminal, a second level signal receiving terminal, and a first node;

a gating logic module that is electrically connected to the first node, the first level signal receiving terminal, the second level signal receiving terminal, a region gating control terminal, and a second node; and an output module that is electrically connected to the second node, the first level signal receiving terminal, the second level signal receiving terminal, and a driving signal output terminal, wherein the shifting module is configured to:

receive a shifting signal at the triggering signal input terminal, a first level signal at the first level signal receiving terminal, a second level signal at the second level signal receiving terminal, a first clock signal at the first clock signal terminal, and a second clock signal at the second clock signal terminal, wherein the shifting signal is gated according to the first clock signal; and control a signal of the first node in response to the first level signal, the first clock signal, and the second clock signal, wherein the triggering signal input terminal is electrically connected to a first node of the scan driving unit of a previous level, the shifting signal is a signal of the first node of the scan driving unit of the previous level, and the signal of the first node is the second level signal or the second clock signal, wherein the gating logic module is configured to:

receive the first level signal at the first level signal receiving terminal and the second level signal at the second level signal receiving terminal; and control a signal of the second node in response to the signal of the first node and a region gating signal received by the region gating control terminal; and wherein the output module is configured to:

receive either the first level signal at the first level signal receiving terminal, or the second level signal at the second level signal receiving terminal; and control, in response to the signal of the second node, a signal outputted by the driving signal output terminal, wherein one of the first level signal and the second level signal is a high-level signal, and the other is a low-level signal, wherein the gating logic module comprises:

a first inversion unit that is electrically connected to the first node, the first level signal receiving terminal, the second level signal receiving terminal, and a third node;

a first region gating unit that is electrically connected to the third node, the region gating control terminal, the first level signal receiving terminal, and the second node; and a second region gating unit that is electrically connected to the third node, the region gating control terminal, the second level signal receiving terminal, and the second node, wherein the first inversion unit is configured to:

receive the first level signal at the first level signal receiving terminal and the second level signal at the second level signal receiving terminal; and control a signal of the third node in response to the signal of the first node, and wherein the first region gating unit is configured to:

receive either the first level signal at the first level signal receiving terminal, or the second level signal at the second level signal receiving terminal; and control the signal of the second node in response to the signal of the third node and the region gating signal received by the region gating control terminal.

2. The display panel of claim 1, wherein the gating logic module comprises:

a first region gating unit that is electrically connected to the first node, the region gating control terminal, the first level signal receiving terminal, and the second node; and a second region gating unit that is electrically connected to the first node, the region gating control terminal, the second level signal receiving terminal, and the second node, wherein the first region gating unit is configured to:

receive either the first level signal at the first level signal receiving terminal, or the second level signal at the second level signal receiving terminal; and control the signal of the second node in response to the signal of the first node and the region gating signal received by the region gating control terminal.

3. The display panel of claim 1, wherein the first region gating unit comprises at least two transistors connected in series, the second region gating unit comprises at least two transistors connected in parallel, and the transistors of the second region gating unit are connected to the transistors of the first region gating unit in series after being connected in parallel, and are coupled to the second node, wherein when the transistors of the first region gating unit are all turned on, the transistors of the second region gating unit are all turned off, so that the first level signal received by the first level signal receiving terminal electrically connected to the first region gating unit is written into the second node, and wherein when at least one transistor of the first region gating unit is turned off, at least one transistor of the second region gating unit is turned on, so that the second level signal received by the second level signal receiving terminal electrically connected to the second region gating unit is written into the second node.

4. The display panel of claim 3, wherein the first region gating unit comprises a first transistor and a second transistor, and the second region gating unit comprises a third transistor and a fourth transistor, wherein a first electrode of the first transistor is electrically connected to the first level signal receiving terminal, wherein a second electrode of the first transistor is electrically connected to a first electrode of the second transistor, wherein a second electrode of the second transistor, a first electrode of the third transistor, and a first electrode of the fourth transistor are all coupled to the second node, wherein a second electrode of the third transistor and a second electrode of the fourth transistor are both electrically connected to the second level signal receiving terminal, wherein a gate of the first transistor is coupled to a gate of the third transistor, and a gate of the second transistor is coupled to a gate of the fourth transistor, wherein when the gating logic module comprises the first inversion unit, the first region gating unit, and the second region gating unit, one of the gates of the first transistor and the third transistor and one of the gates of the second transistor and the fourth transistor are coupled to the third node, and the others of the gates are coupled to the region gating control terminal, and wherein when the gating logic module comprises the first region gating unit and the second region gating unit, one of the gates of the first transistor and the third transistor and one of the gates of the second transistor and the fourth transistor are coupled to the first node, and the others of the gates are coupled to the region gating control terminal.

5. The display panel of claim 4, wherein either a) the first transistor and the second transistor are both P-type transistors, and the third transistor and the fourth transistor are both N-type transistors, or b) the first transistor and the second transistor are both N-type transistors, and the third transistor and the fourth transistor are both P-type transistors.

6. The display panel of claim 1, wherein the first inversion unit comprises a fifth transistor and a sixth transistor, wherein a gate of the fifth transistor and a gate of the sixth transistor are both electrically connected to the first node, a first electrode of the fifth transistor is electrically connected to the first level signal receiving terminal, and a second electrode of the fifth transistor and a first electrode of the sixth transistor are both electrically connected to the third node, and wherein a second electrode of the sixth transistor is electrically connected to the second level signal receiving terminal.

7. The display panel of claim 1, further comprising a first display region and a second display region, wherein the region gating signal comprises a first region gating signal and a second region gating signal, wherein a scan driving unit connected to a pixel in the first display region is configured to receive the first region gating signal, and a scan driving unit connected to a pixel in the second display region is configured to receive the second region gating signal, and wherein one of the first region gating signal and the second region gating signal is a high-level signal, and the other is a low-level signal, so that a signal of the second node of the scan driving unit connected to the pixel in the first display region is one of the first level signal and the second level signal, and a signal of the second node of the scan driving unit connected to the pixel in the second display region is the other of the first level signal and the second level signal.

8. The display panel of claim 1, further comprising a region gating signal line configured to transmit the region gating signal, wherein the region gating control terminals of the scan driving units are connected to a same region gating signal line.

9. The display panel of claim 1, wherein when the signal of the first node is the second clock signal, signals of first nodes of two adjacent scan driving units do not overlap.

10. The display panel of claim 1, wherein the output module comprises a second inversion unit, and the second inversion unit comprises a seventh transistor and an eighth transistor, wherein a gate of the seventh transistor and a gate of the eighth transistor are both electrically connected to the second node, a first electrode of the seventh transistor is electrically connected to the first level signal receiving terminal, and a second electrode of the seventh transistor and a first electrode of the eighth transistor are both electrically connected to the driving signal output terminal, and wherein a second electrode of the eighth transistor is electrically connected to the second level signal receiving terminal.

11. The display panel of claim 1, wherein the shifting module comprises:

an input unit that is electrically connected to the triggering signal input terminal, the first clock signal terminal, and a fourth node;

a first control unit that is electrically connected to the first clock signal terminal, the first level signal receiving terminal, the fourth node, and a fifth node;

a second control unit that is electrically connected to the second level signal receiving terminal, the second clock signal terminal, the fourth node, and the fifth node; and an output unit that is electrically connected to the first level signal receiving terminal, the second level signal receiving terminal, the second clock signal terminal, the fourth node, the fifth node, and the first node, wherein the input unit is configured to:

receive the shifting signal of the triggering signal input terminal; and control a signal of the fourth node in response to the first clock signal received by the first clock signal terminal, wherein the first control unit is configured to:

receive the first clock signal at the first clock signal terminal and the first level signal at the first level signal receiving terminal; and control a signal of the fifth node in response to the signal of the fourth node and the first clock signal received by the first clock signal terminal, wherein the second control unit is configured to:

receive the second level signal at the second level signal receiving terminal; and change the signal of the fourth node in response to the signal of the fifth node and the second clock signal received by the second clock signal terminal, and wherein the output unit is configured to either:

c) receive the second level signal at the second level signal receiving terminal, and control the signal of the first node in response to the signal of the fifth node;

d) receive the second clock signal at the second clock signal terminal, and control the signal of the first node in response to the signal of the fourth node.

12. The display panel of claim 11, wherein the input unit comprises a ninth transistor, and wherein a gate of the ninth transistor is electrically connected to the first clock signal terminal, a first electrode of the ninth transistor is electrically connected to the triggering signal input terminal, and a second electrode of the ninth transistor is electrically connected to the fourth node.

13. The display panel of claim 11, wherein the first control unit comprises a tenth transistor and an eleventh transistor, wherein a gate of the tenth transistor is electrically connected to the first clock signal terminal, a first electrode of the tenth transistor is electrically connected to the first level signal receiving terminal, and a second electrode of the tenth transistor and a second electrode of the eleventh transistor are both electrically connected to the fifth node, and wherein a gate of the eleventh transistor is electrically connected to the fourth node, and a first electrode of the eleventh transistor is electrically connected to the first clock signal terminal.

14. The display panel of claim 11, wherein the second control unit comprises a twelfth transistor and a thirteenth transistor, wherein a gate of the twelfth transistor is electrically connected to the second clock signal terminal, a first electrode of the twelfth transistor is electrically connected to the fourth node, and a second electrode of the twelfth transistor is electrically connected to a first electrode of the thirteenth transistor, and wherein a gate of the thirteenth transistor is electrically connected to the fifth node, and a second electrode of the thirteenth transistor is electrically connected to the second level signal receiving terminal.

15. The display panel of claim 11, wherein the output unit comprises a fourteenth transistor, a fifteenth transistor, a sixteenth transistor, a first capacitor, and a second capacitor, wherein a gate of the fourteenth transistor is electrically connected to the first level signal receiving terminal, a first electrode of the fourteenth transistor is electrically connected to the fourth node, and a second electrode of the fourteenth transistor is electrically connected to a first electrode of the first capacitor and a gate of the fifteenth transistor, wherein a second electrode of the first capacitor, a second electrode of the fifteenth transistor, and a first electrode of the sixteenth transistor are all electrically connected to the first node, wherein a first electrode of the fifteenth transistor is electrically connected to the second clock signal terminal, and wherein a gate of the sixteenth transistor and a first electrode of the second capacitor are both electrically connected to the fifth node, and a second electrode of the sixteenth transistor and a second electrode of the second capacitor are both electrically connected to the second level signal receiving terminal.

16. The display panel of claim 1, further comprising a first clock signal line and a second clock signal line, wherein a first clock signal terminal of a scan driving unit of an odd level is electrically connected to the first clock signal line, and a second clock signal terminal of the scan driving unit of the odd level is electrically connected to the second clock signal line, and wherein a first clock signal terminal of a scan driving unit of an even level is electrically connected to the second clock signal line, and a second clock signal terminal of the scan driving unit of the even level is electrically connected to the first clock signal line.

17. An electronic device, comprising:

a display panel including a scan driving circuit including N cascaded scan driving units, wherein N is a positive integer greater than or equal to 2, and wherein the scan driving unit of each level comprises:

a shifting module that is electrically connected to a triggering signal input terminal, a first clock signal terminal, a second clock signal terminal, a first level signal receiving terminal, a second level signal receiving terminal, and a first node;

a gating logic module that is electrically connected to the first node, the first level signal receiving terminal, the second level signal receiving terminal, a region gating control terminal, and a second node; and an output module that is electrically connected to the second node, the first level signal receiving terminal, the second level signal receiving terminal, and a driving signal output terminal, wherein the shifting module is configured to:

receive a shifting signal at the triggering signal input terminal, a first level signal at the first level signal receiving terminal, a second level signal at the second level signal receiving terminal, a first clock signal at the first clock signal terminal, and a second clock signal at the second clock signal terminal, wherein the shifting signal is gated according to the first clock signal; and control a signal of the first node in response to the first level signal, the first clock signal, and the second clock signal, wherein the triggering signal input terminal is electrically connected to a first node of the scan driving unit of a previous level, the shifting signal is a signal of the first node of the scan driving unit of the previous level, and the signal of the first node is the second level signal or the second clock signal, wherein the gating logic module is configured to:

receive the first level signal at the first level signal receiving terminal and the second level signal at the second level signal receiving terminal; and control a signal of the second node in response to the signal of the first node and a region gating signal received by the region gating control terminal; and wherein the output module is configured to:

receive either the first level signal at the first level signal receiving terminal, or the second level signal at the second level signal receiving terminal; and control, in response to the signal of the second node, a signal outputted by the driving signal output terminal, wherein one of the first level signal and the second level signal is a high-level signal, and the other is a low-level signal, wherein the gating logic module comprises:

a first inversion unit that is electrically connected to the first node, the first level signal receiving terminal, the second level signal receiving terminal, and a third node;

a first region gating unit that is electrically connected to the third node, the region gating control terminal, the first level signal receiving terminal, and the second node; and a second region gating unit that is electrically connected to the third node, the region gating control terminal, the second level signal receiving terminal, and the second node, wherein the first inversion unit is configured to:

receive the first level signal at the first level signal receiving terminal and the second level signal at the second level signal receiving terminal; and control a signal of the third node in response to the signal of the first node, and wherein the first region gating unit is configured to:

receive either the first level signal at the first level signal receiving terminal, or the second level signal at the second level signal receiving terminal; and control the signal of the second node in response to the signal of the third node and the region gating signal received by the region gating control terminal.

18. The electronic device of claim 17, wherein the gating logic module comprises:

a first region gating unit that is electrically connected to the first node, the region gating control terminal, the first level signal receiving terminal, and the second node; and a second region gating unit that is electrically connected to the first node, the region gating control terminal, the second level signal receiving terminal, and the second node, wherein the first region gating unit is configured to:

receive either the first level signal at the first level signal receiving terminal, or the second level signal at the second level signal receiving terminal; and control the signal of the second node in response to the signal of the first node and the region gating signal received by the region gating control terminal.

19. The electronic device of claim 17, wherein the first region gating unit comprises at least two transistors connected in series, the second region gating unit comprises at least two transistors connected in parallel, and the transistors of the second region gating unit are connected to the transistors of the first region gating unit in series after being connected in parallel, and are coupled to the second node, wherein when the transistors of the first region gating unit are all turned on, the transistors of the second region gating unit are all turned off, so that the first level signal received by the first level signal receiving terminal electrically connected to the first region gating unit is written into the second node, and wherein when at least one transistor of the first region gating unit is turned off, at least one transistor of the second region gating unit is turned on, so that the second level signal received by the second level signal receiving terminal electrically connected to the second region gating unit is written into the second node.

20. The electronic device of claim 19, wherein the first region gating unit comprises a first transistor and a second transistor, and the second region gating unit comprises a third transistor and a fourth transistor, wherein a first electrode of the first transistor is electrically connected to the first level signal receiving terminal, wherein a second electrode of the first transistor is electrically connected to a first electrode of the second transistor, wherein a second electrode of the second transistor, a first electrode of the third transistor, and a first electrode of the fourth transistor are all coupled to the second node, wherein a second electrode of the third transistor and a second electrode of the fourth transistor are both electrically connected to the second level signal receiving terminal, wherein a gate of the first transistor is coupled to a gate of the third transistor, and a gate of the second transistor is coupled to a gate of the fourth transistor, wherein when the gating logic module comprises the first inversion unit, the first region gating unit, and the second region gating unit, one of the gates of the first transistor and the third transistor and one of the gates of the second transistor and the fourth transistor are coupled to the third node, and the others of the gates are coupled to the region gating control terminal, and wherein when the gating logic module comprises the first region gating unit and the second region gating unit, one of the gates of the first transistor and the third transistor and one of the gates of the second transistor and the fourth transistor are coupled to the first node, and the others of the gates are coupled to the region gating control terminal.

* * * * *